US012115649B2

(12) United States Patent
Williams et al.

(10) Patent No.: US 12,115,649 B2
(45) Date of Patent: Oct. 15, 2024

(54) MODULAR TOOL STORAGE SYSTEM WITH SHOP STORAGE DEVICE

(71) Applicant: Milwaukee Electric Tool Corporation, Brookfield, WI (US)

(72) Inventors: Aaron M. Williams, Milwaukee, WI (US); Nicole Z. Summersett, Milwaukee, WI (US); Ryan C. Dick, Sussex, WI (US); Christian R. Braun, Milwaukee, WI (US); Logan C. Arlov, Mequon, WI (US); Lucy Seokyung Cho, Rolling Meadows, IL (US); Scott M. Hangartner, Richfield, WI (US); Evan Maverick James Quiros, Milwaukee, WI (US); John N. Uelmen, Campbellsport, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 17/876,051

(22) Filed: Jul. 28, 2022

(65) Prior Publication Data

US 2023/0036215 A1 Feb. 2, 2023

Related U.S. Application Data

(60) Provisional application No. 63/273,620, filed on Oct. 29, 2021, provisional application No. 63/246,113,
(Continued)

(51) Int. Cl.
*B25H 3/02* (2006.01)
*A47F 5/08* (2006.01)
(Continued)

(52) U.S. Cl.
CPC ............... *B25H 3/021* (2013.01); *A47F 5/08* (2013.01); *B25H 3/04* (2013.01); *B25H 3/06* (2013.01); *Y10S 211/01* (2013.01)

(58) Field of Classification Search
CPC .. B25H 3/021; B25H 3/04; B25H 3/06; A47F 5/08; Y10S 211/01
(Continued)

(56) References Cited

U.S. PATENT DOCUMENTS 1,240,705 A 9/1917 Grode
3,616,622 A * 11/1971 Friedman ............. A47L 9/1436 403/DIG. 1
(Continued)

FOREIGN PATENT DOCUMENTS

CN 2496800 6/2002
CN 202161280 3/2012
(Continued)

*Primary Examiner* — Jennifer E. Novosad
(74) *Attorney, Agent, or Firm* — Reinhart Boerner Van Deuren s.c.

(57) ABSTRACT

Various embodiments of a modular tool storage system include one or more storage devices. One embodiment has a support including a base defining a back surface, an opposing front surface, and one or more sidewalls extending from the front surface. The front surface and the one or more sidewalls defining a containment area. The support includes coupling devices, such as male couplers, to couple the support to other components within the modular storage system.

6 Claims, 38 Drawing Sheets

Related U.S. Application Data filed on Sep. 20, 2021, provisional application No. 63/227,573, filed on Jul. 30, 2021.

(51) Int. Cl.
*B25H 3/04* (2006.01)
*B25H 3/06* (2006.01)

(58) Field of Classification Search
USPC .......... 211/70.6, DIG. 1, 10, 87.01; 206/350, 206/560; 248/222.51, 222.52, 683, 467, 248/206.5, 309.4, 506
See application file for complete search history.

(56) References Cited

U.S. PATENT DOCUMENTS 3,880,390 A * 4/1975 Niven .................. A47F 5/0815 248/220.43
3,891,172 A 6/1975 Einhorn
4,405,108 A * 9/1983 Muirhead ............ A47F 5/0823 211/DIG. 1
4,609,173 A * 9/1986 Belokin ................ A47K 10/12 211/DIG. 1
4,653,716 A 3/1987 Sakaguchi
4,756,638 A * 7/1988 Neyret .................... E05B 9/084 70/451
5,078,281 A * 1/1992 Johnson .................. B25H 3/06 211/DIG. 1
5,213,240 A * 5/1993 Dietz .................. G01B 3/1071 224/678
D342,005 S 12/1993 Forsberg
5,277,387 A 1/1994 Lewis et al.
5,397,006 A * 3/1995 Terrell ................. A47F 5/0846 211/74
5,544,747 A * 8/1996 Horn ....................... B25H 3/06 211/DIG. 1
5,572,776 A 11/1996 Murphy et al.
5,597,260 A * 1/1997 Peterson ................ F16B 21/04 403/348
5,604,958 A * 2/1997 Anscher ............... A45C 7/0086 24/165
5,699,910 A * 12/1997 Kubat ...................... B25H 3/06 206/373
5,715,951 A 2/1998 Dembicks
5,725,107 A 3/1998 Dembicks
5,855,284 A 1/1999 Dembicks
5,897,001 A 4/1999 Dembicks
5,957,421 A * 9/1999 Barbour .................... A45F 5/02 248/314
6,151,805 A * 11/2000 Savoie ................ A43C 15/161 36/114
6,254,302 B1 * 7/2001 Kraus ..................... F16B 21/09 403/328
6,302,617 B1 * 10/2001 Rumpp ................... F16B 21/02 403/348
6,398,179 B1 * 6/2002 Soles .................... F16F 9/0454 248/617
6,443,316 B1 * 9/2002 Mao ........................ A47L 19/04 211/74
6,811,127 B1 * 11/2004 Shiao ....................... B25H 3/04 211/DIG. 1
6,932,312 B1 8/2005 Chen
7,147,399 B2 * 12/2006 Viscount .............. A63C 19/062 403/348
D547,048 S 7/2007 Conway et al.
7,464,908 B2 * 12/2008 Files ....................... F41B 5/066 248/229.16
D636,657 S 4/2011 Quinlan et al.
D642,039 S 7/2011 Forsberg et al.
D656,883 S 4/2012 Patalak et al.
D666,134 S 8/2012 Patalak et al.
8,267,363 B2 * 9/2012 Begic ..................... F16M 13/02 248/221.11
8,439,209 B2 * 5/2013 Strollo .................. A47B 81/00 211/75
8,459,472 B2 * 6/2013 Hofman ................ A47F 5/0815 211/106.01
8,465,221 B2 * 6/2013 Yan ...................... H05K 7/1489 403/348
8,485,482 B2 7/2013 Patalak et al.
8,528,871 B2 9/2013 Begic et al.
8,540,198 B2 * 9/2013 Keyvanloo .......... A47B 96/061 248/220.21
8,622,590 B2 * 1/2014 Cheng ..................... F21V 17/12 248/222.51
D700,764 S * 3/2014 Goldstein ........................ D99/5
D771,476 S 11/2016 Prince et al.
9,615,722 B2 4/2017 Mesa et al.
D796,750 S 9/2017 Hederstierna et al.
10,052,012 B2 8/2018 Mesa et al.
10,125,542 B1 * 11/2018 Wandschneider ........ E06C 7/14
10,125,919 B2 11/2018 Forsberg
10,165,927 B2 1/2019 Mesa et al.
10,348,352 B2 * 7/2019 Barnett .................. F16M 13/00
10,405,676 B1 9/2019 Underwood
10,463,226 B2 11/2019 Mesa et al.
10,493,355 B2 * 12/2019 Reid ....................... A45F 5/021
10,583,962 B2 3/2020 Brunner et al.
10,772,444 B2 7/2020 Gousse et al.
11,598,149 B1 * 3/2023 Blake ........................ E06C 7/14
2004/0108285 A1 * 6/2004 Martin .................... A47J 47/04 211/DIG. 1
2008/0179268 A1 * 7/2008 Jang ......................... B25H 5/00 211/126.1
2009/0200441 A1 * 8/2009 Kuhn .................... A47F 5/0815 248/206.5
2011/0303798 A1 12/2011 Bader et al.
2013/0334383 A1 12/2013 Begic et al.
2015/0196370 A1 * 7/2015 Wong ....................... A61C 3/04 29/428
2017/0166352 A1 6/2017 Hoppe et al.
2018/0256766 A1 9/2018 Gareiss et al.
2019/0225371 A1 7/2019 Hoppe et al.
2020/0147781 A1 5/2020 Squiers et al.
2020/0165036 A1 5/2020 Squiers et al.
2022/0040842 A1 * 2/2022 Groves .................. F16M 13/02
2023/0036215 A1 * 2/2023 Williams ................. B25H 3/04
2023/0122425 A1 4/2023 Camp et al.
2023/0270266 A1 * 8/2023 Paprocki ............... A47F 5/0853 211/94.01
2023/0301429 A1 * 9/2023 Braun ...................... B25H 3/04 312/107

FOREIGN PATENT DOCUMENTS

EP 0507721 12/1994
WO WO8500132 1/1985
WO WO9300202 1/1993
WO WO05042212 5/2005
WO WO-2017191628 A1 * 11/2017 ............. A45C 13/02

* cited by examiner

MODULAR TOOL STORAGE SYSTEM WITH SHOP STORAGE DEVICE

CROSS-REFERENCE TO RELATED PATENT APPLICATIONS

The present application claims the benefit of and priority to U.S. Provisional Application No. 63/227,573, filed on Jul. 30, 2021, U.S. Provisional Application No. 63/246,113, filed on Sep. 20, 2021, and U.S. Provisional Application No. 63/273,620, filed on Oct. 29, 2021, each of which is incorporated herein by reference in its entirety.

BACKGROUND OF THE INVENTION

The present disclosure is directed generally to the field of tool storage. The present disclosure relates specifically to devices for shop, garage, wall, etc. storage compatible with modular tool storage systems, such as modular and stackable toolboxes and other compatible devices and to storage systems including such devices.

SUMMARY OF THE INVENTION

Various embodiments the invention relates to devices for shop, garage, wall, etc. storage that are compatible with modular tool storage systems, such as modular and stackable toolboxes and other compatible systems, and to related storage systems that utilize such devices.

One embodiment of the invention relates to a support mechanism including a base defining a back surface and an opposing front surface, a support structure extending forward from the front surface, and a plurality of male couplers extending from the back surface. The support structure includes a curved support element, and the support element defines an internal receiving area configured to receive a cylindrical container. The plurality of male couplers each include a body extending from the back surface, a first tongue, and a second tongue, the first tongue and the second tongue both extending from the body and both offset from and above the back surface. The first tongue defines a first channel between the back surface and the first tongue, and the second tongue defines a second channel between the back surface and the second tongue. The first channel and second channel each extend on opposing sides of the body, and each channel includes a front open end and a back closed end.

In various embodiments, the support element defines a circular shape. In various embodiments, the plurality of male couplers are arranged in a grid. In various embodiments, the grid includes at least two columns of at least two male couplers. In various embodiments, the grid includes at least two columns of at least three male couplers.

Another embodiment of the invention relates to support mechanism including a base defining a back surface and an opposing front surface, one or more sidewalls extending from the front surface, the front surface and the one or more sidewalls defining a containment area, a magnet coupled to the base, a support structure extending from the back surface, and a first protrusion extending circumferentially around and from the support structure. The first protrusion is offset from and above the back surface.

In various embodiments, the support mechanism includes at least three protrusions including the first protrusion. Each of the at least three protrusions extends circumferentially around and from the support structure, and each of the at least three protrusions are offset from and above the back surface.

Another embodiment of the invention relates to a battery charger including a base defining a back surface, a power input coupled to the base and configured to receive power, a first coupling interface coupled to the base, and a first male coupler extending from the back surface. The first coupling interface is configured to physically couple to a first rechargeable power tool battery and provide power received from the power input to the first rechargeable power tool battery. The first male coupler includes a body extending from the back surface, a first tongue, and a second tongue, the first tongue and the second tongue both extending from the body and both offset from and above the back surface. The first tongue defines a first channel between the back surface and the first tongue, and the second tongue defines a second channel between the back surface and the second tongue. The first channel and second channel each extend on opposing sides of the body, and each channel includes a front open end and a back closed end.

In various embodiments, the battery charger includes a second coupling interface coupled to the base, the second coupling interface configured to physically couple to a second rechargeable power tool battery and provide power received from the power input to the second rechargeable power tool battery. The first coupling interface couples to a different type of battery than the second coupling interface. In various embodiments, the battery charger includes a plurality of male couplers including the first male coupler. Each of the plurality of male couplers extends from the back surface. Each of the plurality of male couplers includes a body extending from the back surface, a first tongue, and a second tongue, the first tongue and the second tongue both extending from the body and both offset from and above the back surface. The first tongue defines a first channel between the back surface and the first tongue, and the second tongue defines a second channel between the back surface and the second tongue. The first channel and second channel each extend on opposing sides of the body, and each channel includes a front open end and a back closed end.

Additional features and advantages will be set forth in the detailed description which follows, and, in part, will be readily apparent to those skilled in the art from the description or recognized by practicing the embodiments as described in the written description included, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Referring generally to the figures, various embodiments of devices for shop, garage, wall, etc. storage that are compatible with modular tool storage systems, such as modular and stackable toolboxes and other compatible systems, are provided.

As explained in more detail in the attached figures, in general, the storage system includes a plate with multiple locking/mounting locations that can be supported from a structure, such as a shop wall. The storage system then includes one or more storage devices that have a first area/front surface configured to support a tool, fastener, battery charger, etc. and a rear area/surface with one or more mount structure that is configured to engage with a locking/mounting location of the plate such that the storage device is supported from the plate. In this manner a customizable shop/wall storage system compatible with modular tool storage is provided.

Figure 1:
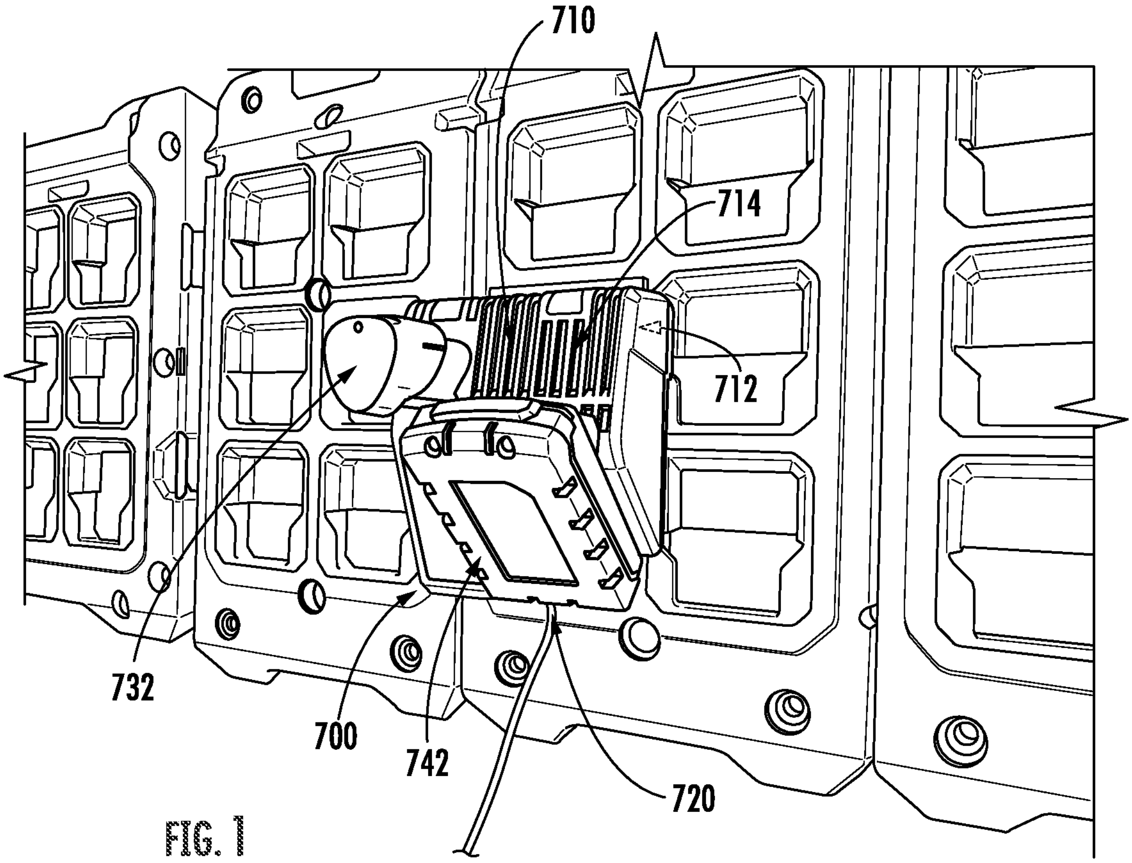
FIGS. 1-2 are perspective views of a battery charger coupled to a coupling platform, according to an exemplary embodiment.
Figure 2:
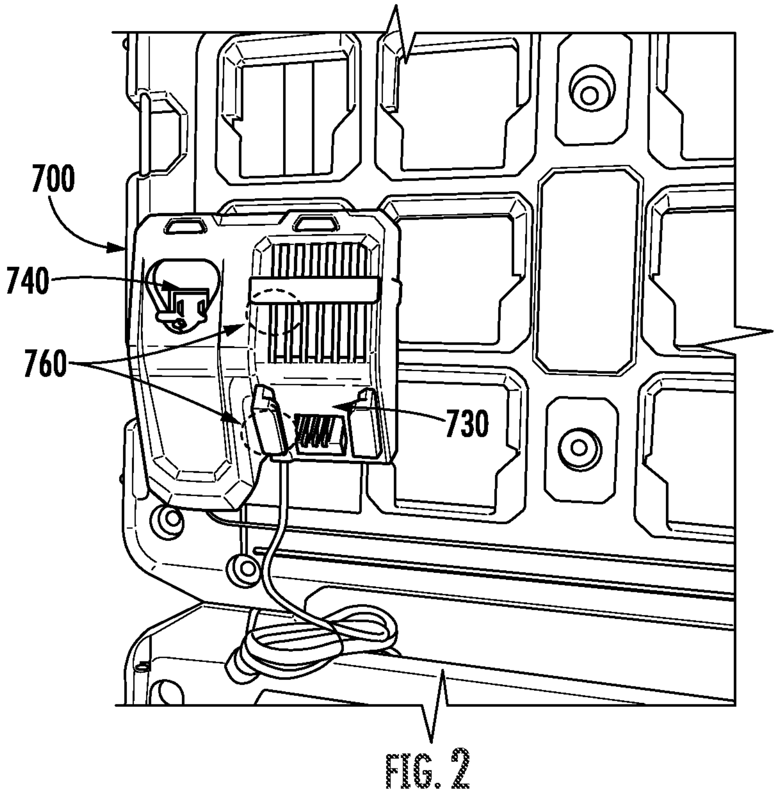

Referring to FIG. 1, various aspects of a battery charger, shown as power tool battery charger 700, configured to couple within a modular system, are shown. In various embodiments the bottom of battery charger 700 includes a male coupler.

In various embodiments, one or more of the couplers described herein are compatible with the coupling mechanism(s) described in International Patent International Patent Publication No. WO 2017/191628, which is incorporated by reference in its entirety.

In various embodiments, battery charger 700 includes a base 710 defining a back surface 712 and a front surface 714 opposite the back surface 712, a power input 720 coupled to the base and configured to receive power (e.g., electricity, such as AC from a wall outlet), a first coupling interface 730 coupled to the base 710, and a first male coupler 760 extending from the back surface 712. In various embodiments, the male coupler(s) extending from back surface 712 are structurally and functionally the same or similar to male coupler 800 shown in FIGS. 74-75. The first coupling interface 730 is configured to physically couple to a battery, shown as first rechargeable power tool battery 732, and provide power received from the power input 720 to the first rechargeable power tool battery 732.

In various embodiments, battery charger 700 includes a second coupling interface 740 coupled to the base 710. The second coupling interface 740 is configured to physically couple to a battery, shown as second rechargeable power tool battery 742, and provide power received from the power input 720 to the second rechargeable power tool battery 742. In various embodiments, the first coupling interface 730 and the second coupling interface 740 couple to different types and/or shaped batteries (e.g., first rechargeable power tool battery 722 is a different type of battery than second rechargeable power tool battery 742).

In various embodiments, the battery charger 700 includes a plurality of male couplers (e.g., male couplers 800 shown in FIGS. 74-75) including the first male coupler. For example, each of the plurality of male couplers includes a body extending from the back surface, a first tongue, and a second tongue, the first tongue and the second tongue both extending from the body and both offset from and above the back surface, the first tongue defining a first channel between the back surface and the first tongue, the second tongue defining a second channel between the back surface and the second tongue, the first channel and second channel each extending on opposing sides of the body, each channel comprising a front open end and a back closed end.

In a specific embodiment, a storage system includes one or more panels (e.g., as shown in FIG. 1) that attach to walls and include include a plurality of female couplers configured to couple with male couplers (e.g., male coupler 800). The storage system further includes battery charger 700, and optionally also one or more of the rechargeable batteries.

Figure 3:
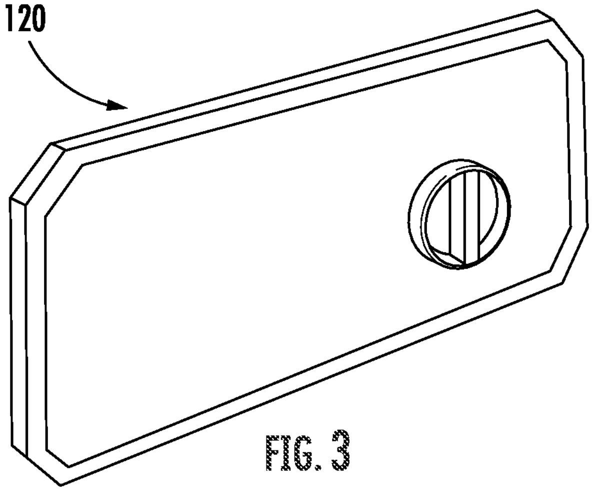
FIGS. 3-12B are several views of coupling mechanisms, according to exemplary embodiments.
Figure 4:
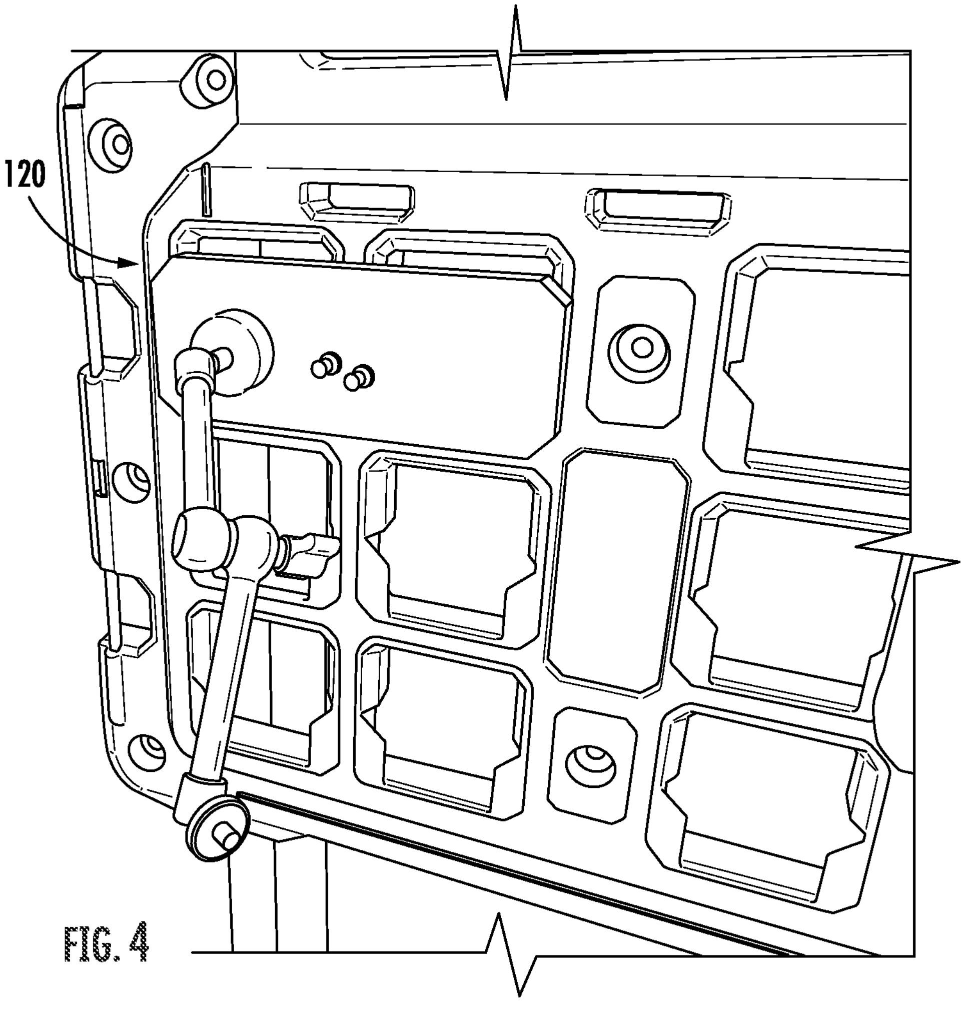
Figure 6:
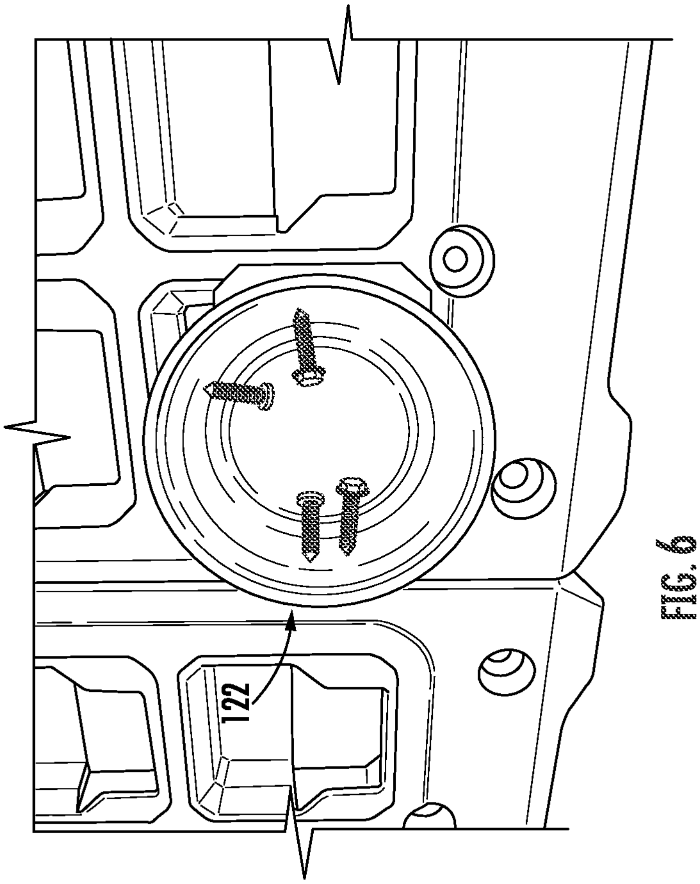
Figure 7:
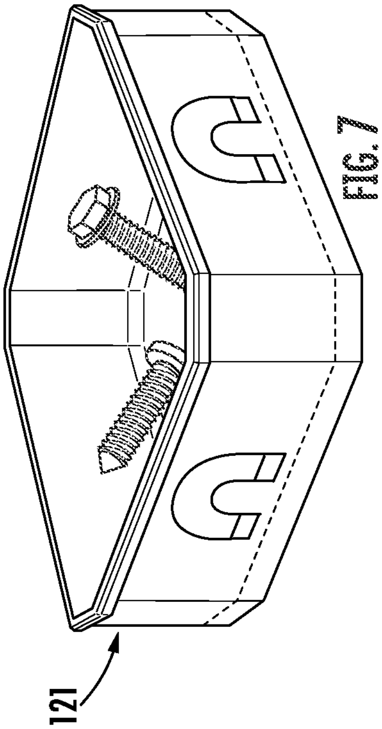
Figure 5:
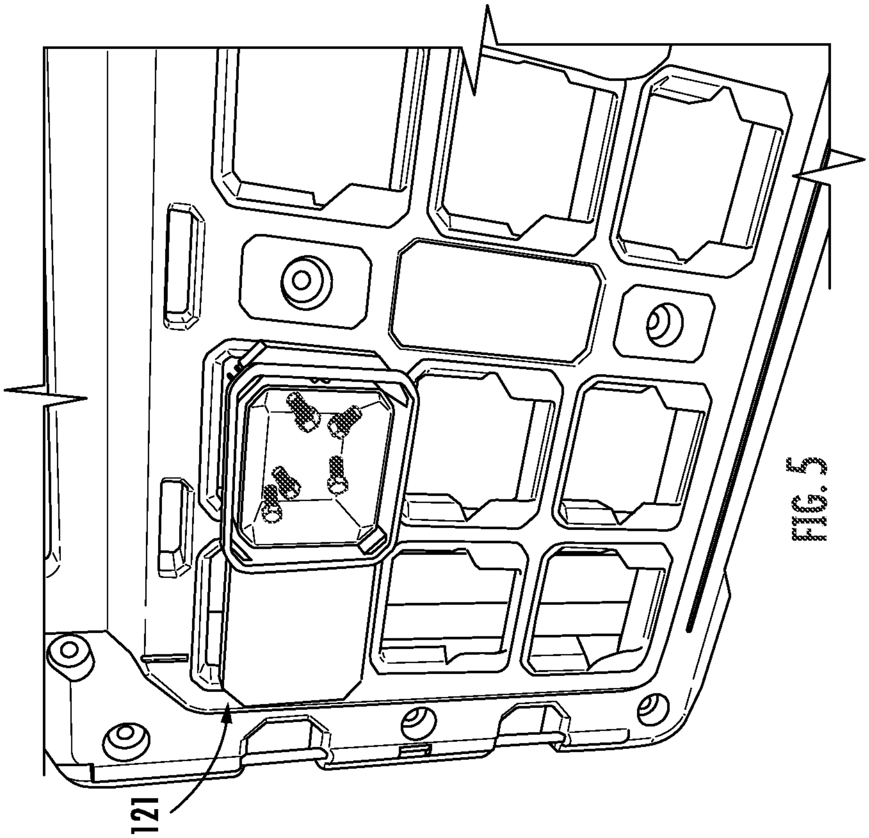
Figure 8:
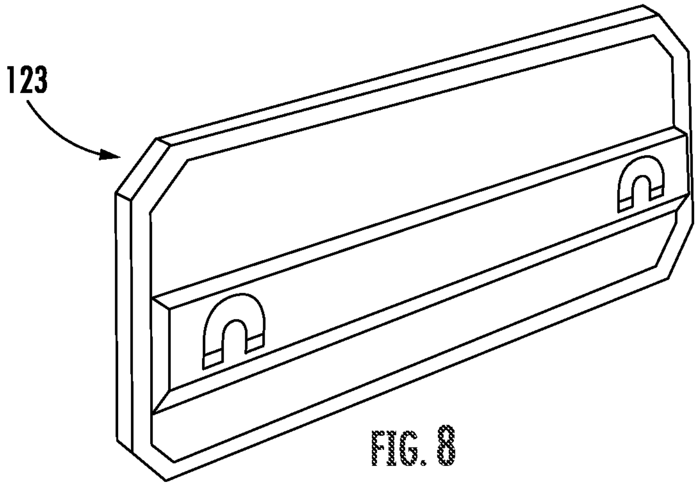
Figure 9:
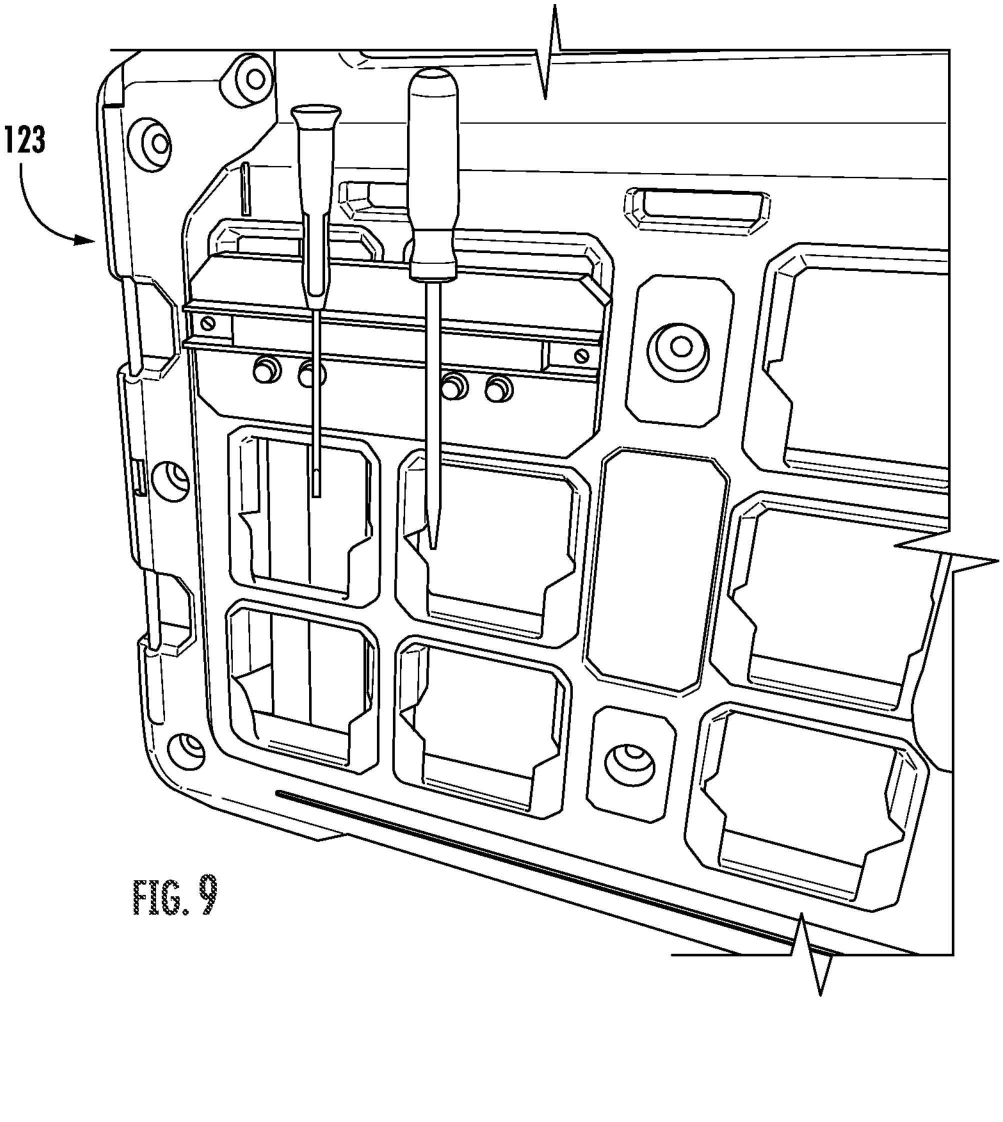
Figure 10:
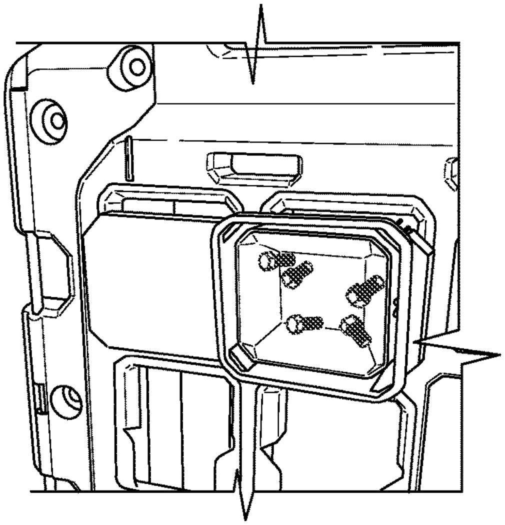

Referring to FIGS. 3-12, various aspects of coupling mechanisms are shown. Referring to FIGS. 3-4, support platform 120 couples to a modular system and is configured to magnetically couple with other devices, such as via support platform 120 being magnetic and/or support platform 120 being ferrous. Referring to FIGS. 5-7, container 121, container 122, and container 123 couple to support platform 120 are shown. As can be seen, metallic objects are biased by a magnet to remain within container 121, container 122, or container 123. Referring to FIGS. 8-9, a container 123 couples within a modular system and is configured to support one or more tools, such as screwdrivers. In various embodiments, container 123 includes one or more magnets, such as a magnetic strip, that couple to the one or more tools. For example, the magnets may be internal to the container 123, such as internal to the base of container 123 (e.g., within housing of container 123). As another example, the magnet may be external to container 123, such as coupled to a front surface of container 123 such that ferrous fasteners directly interface with and couple to the magnet.

Figure 11:
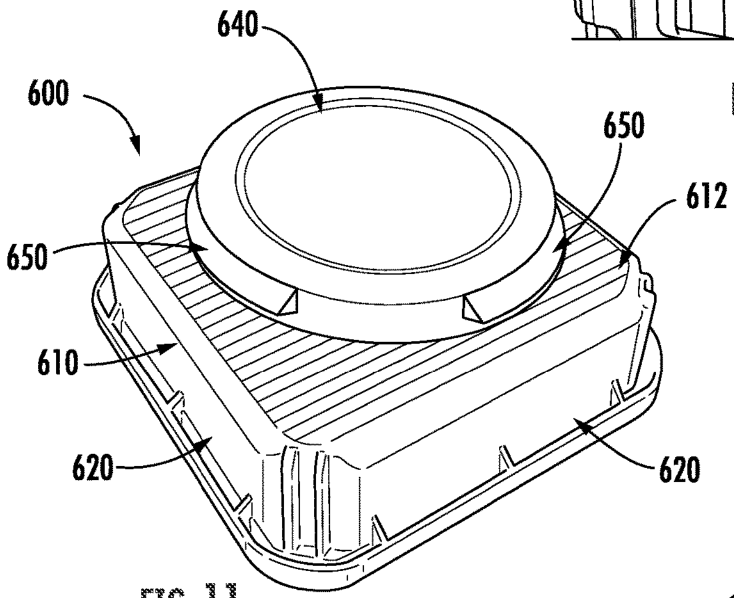
Figure 12B:
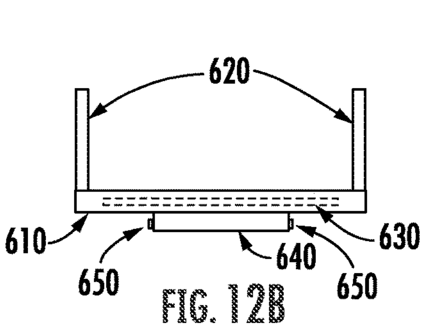
Figure 12A:
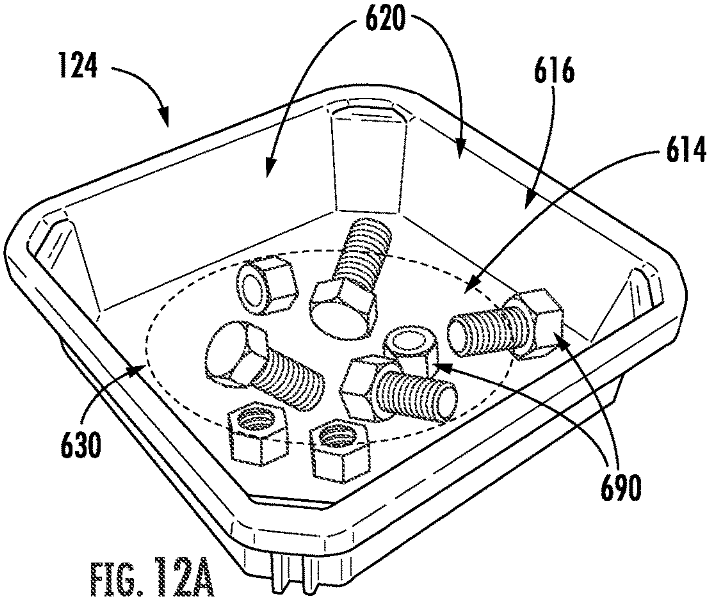
Figure 13:
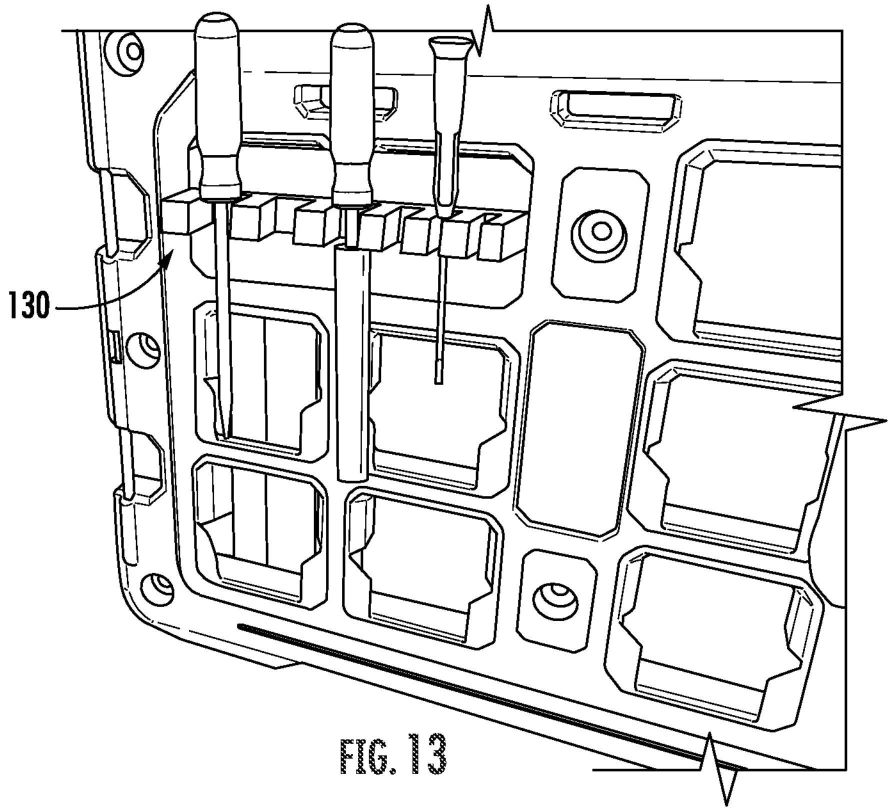
FIGS. 13-19 are several views of support platforms configured to couple to a modular system, according to exemplary embodiments.
Figure 14:
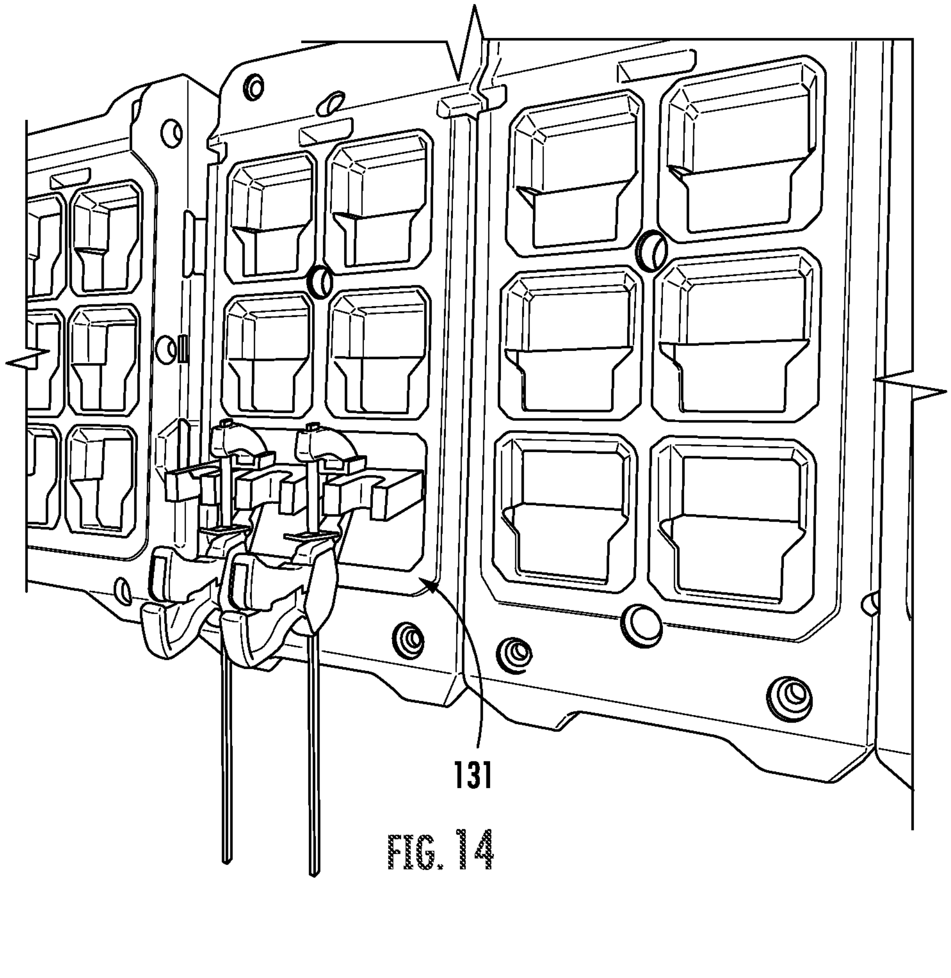
Figure 15:
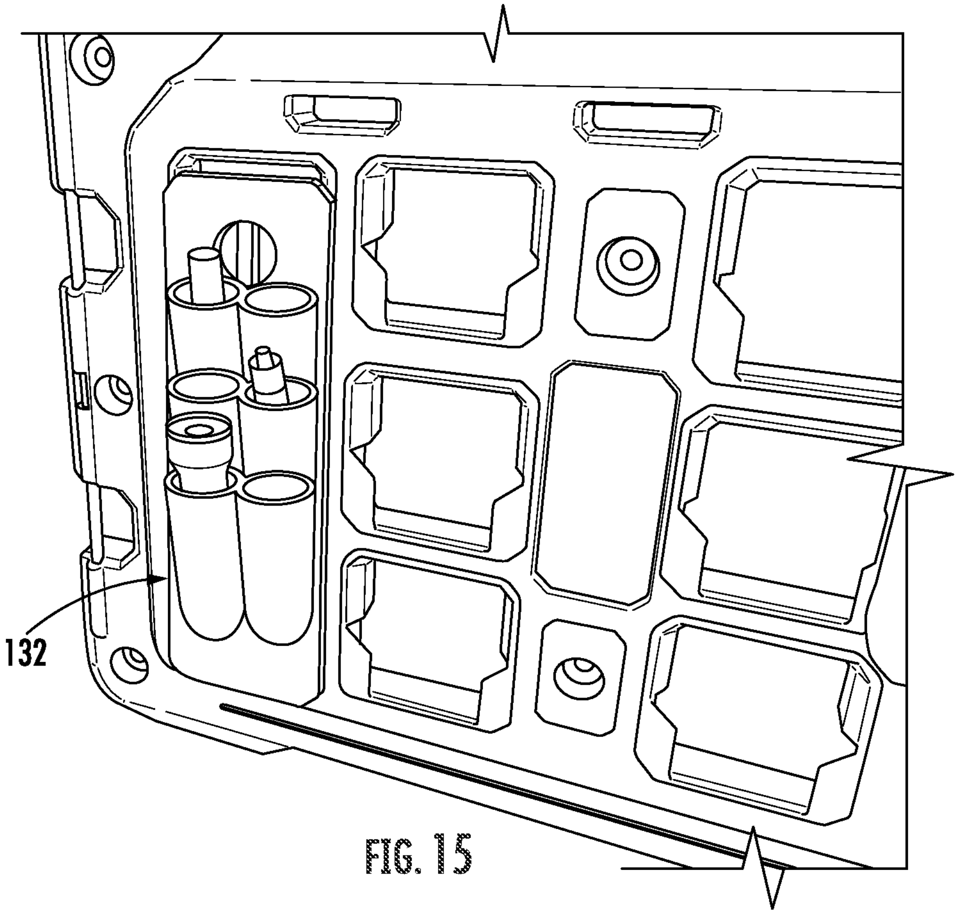
Figure 16:
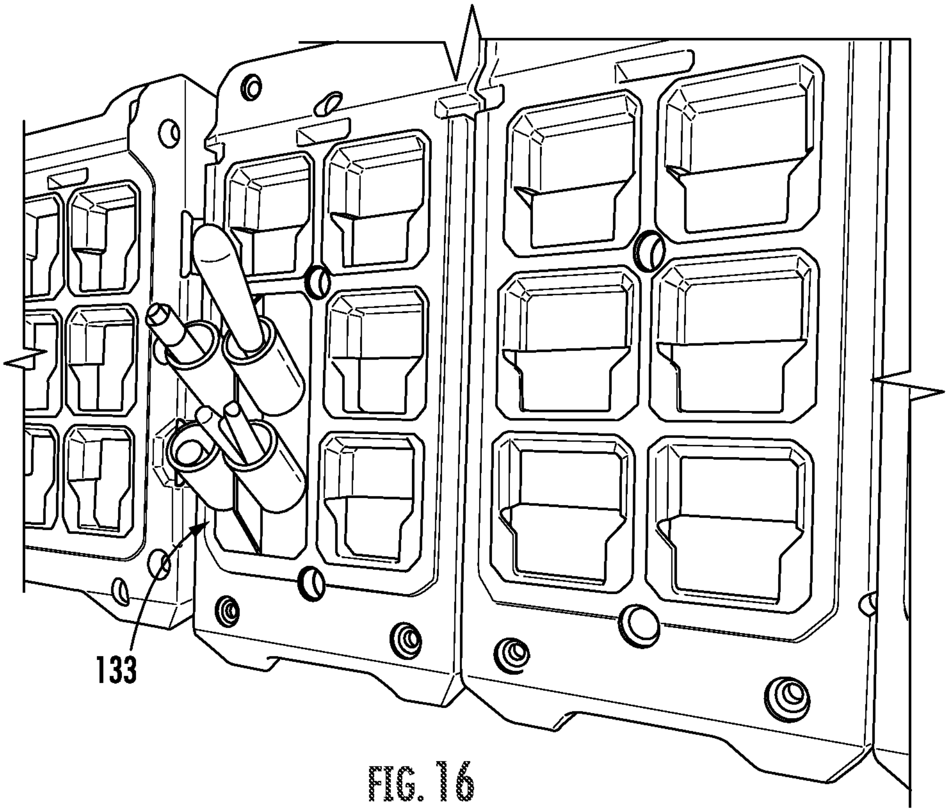
Figure 17:
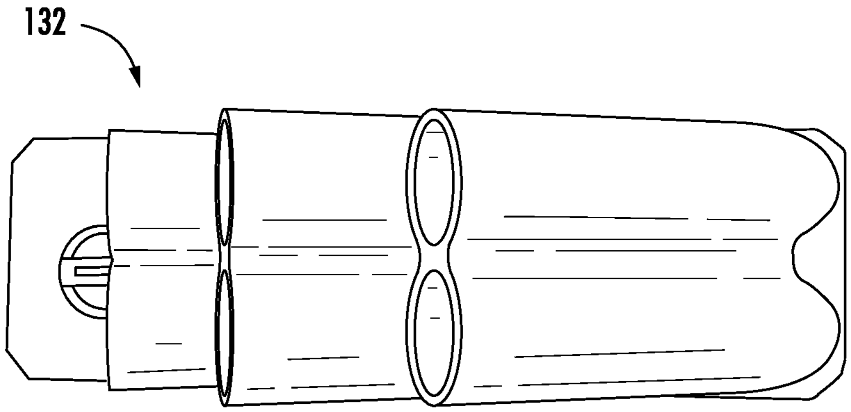
Figure 18:
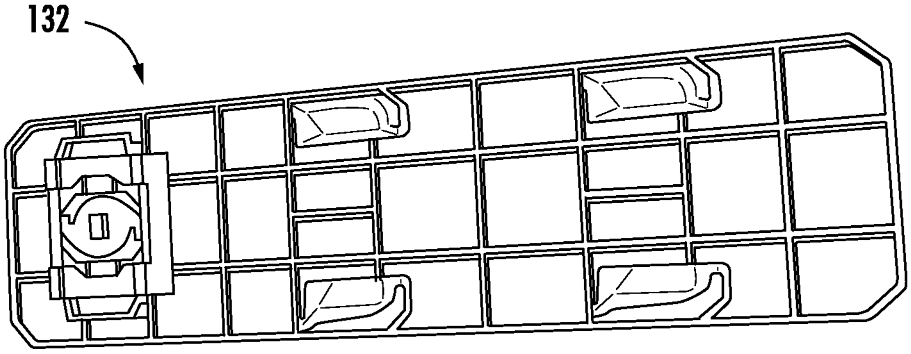
Figure 19:
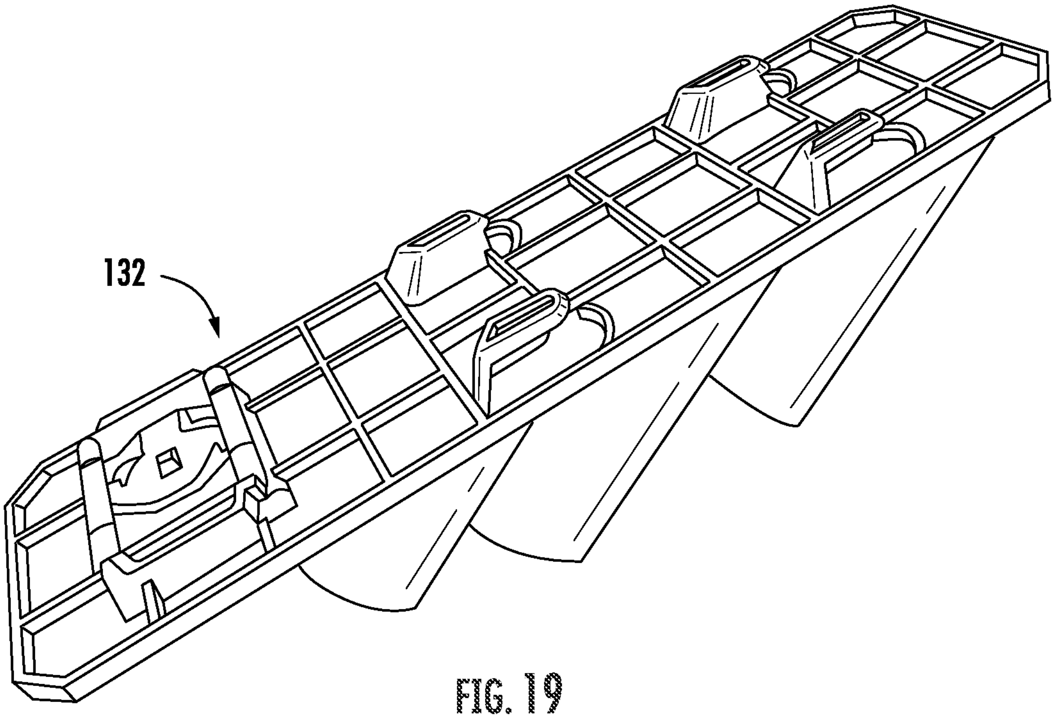
Figure 20:
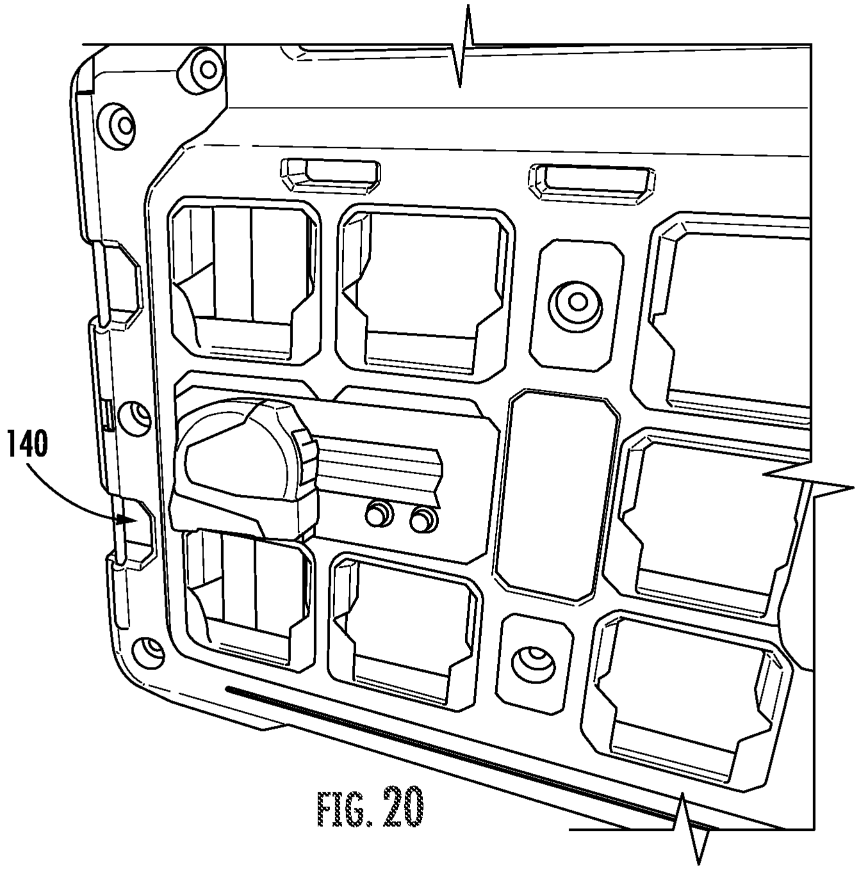
FIGS. 20-26 are several views of support platforms configured to couple to a modular system, according to exemplary embodiments.
Figure 21:
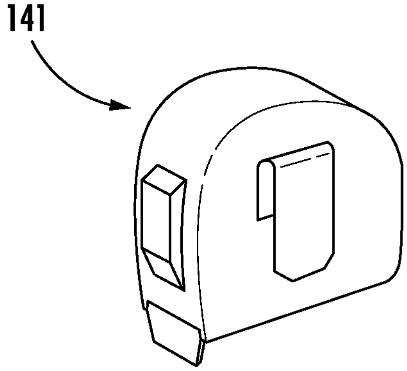
Figure 22:
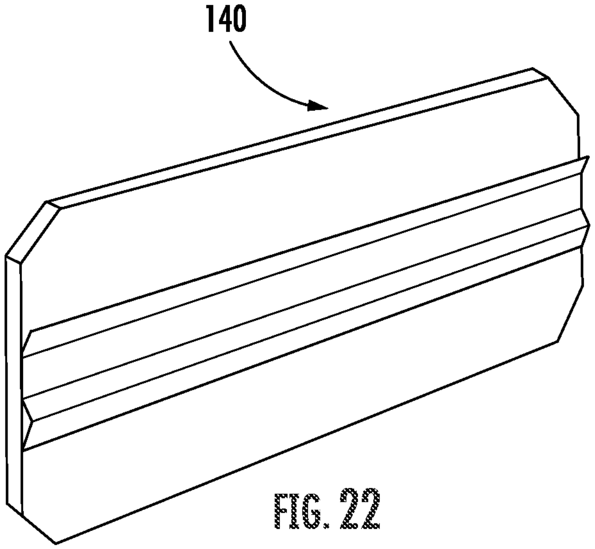
Figure 23:
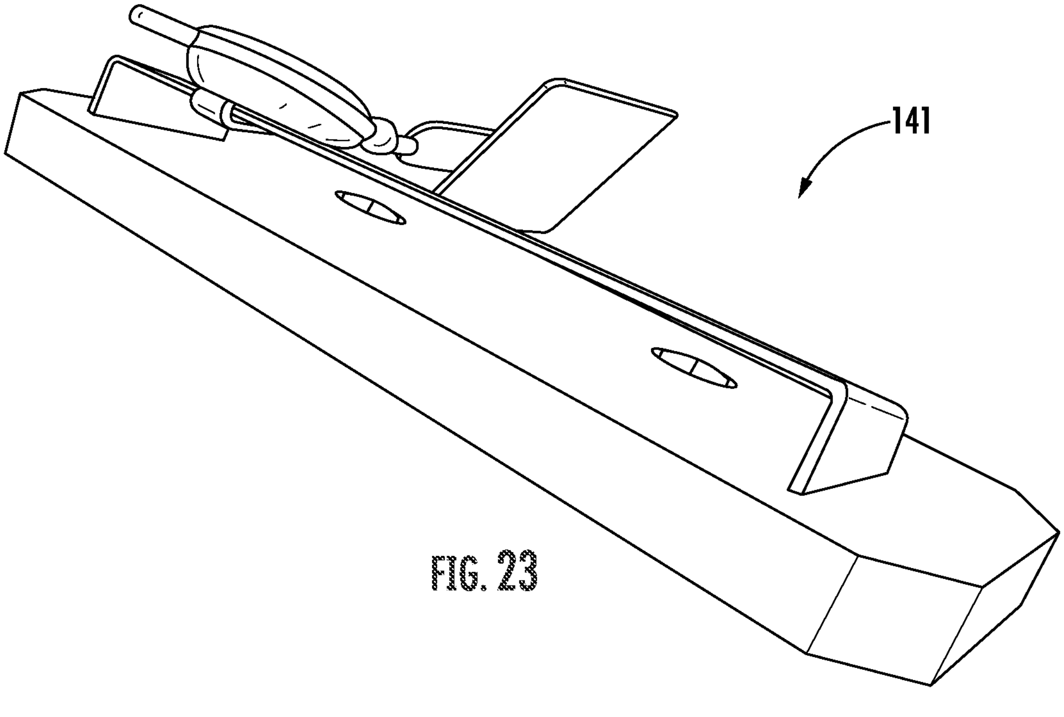
Figure 24:
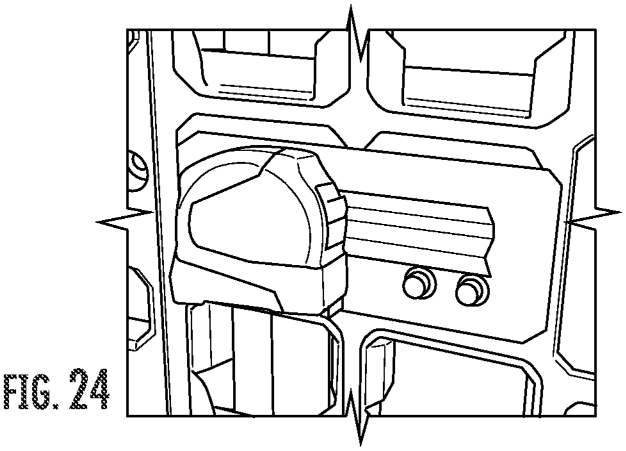
Figure 25:
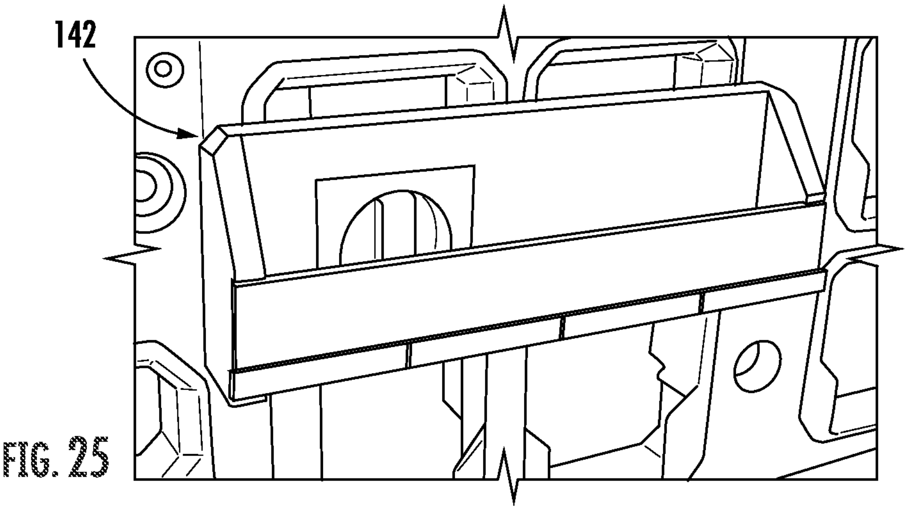
Figure 26:
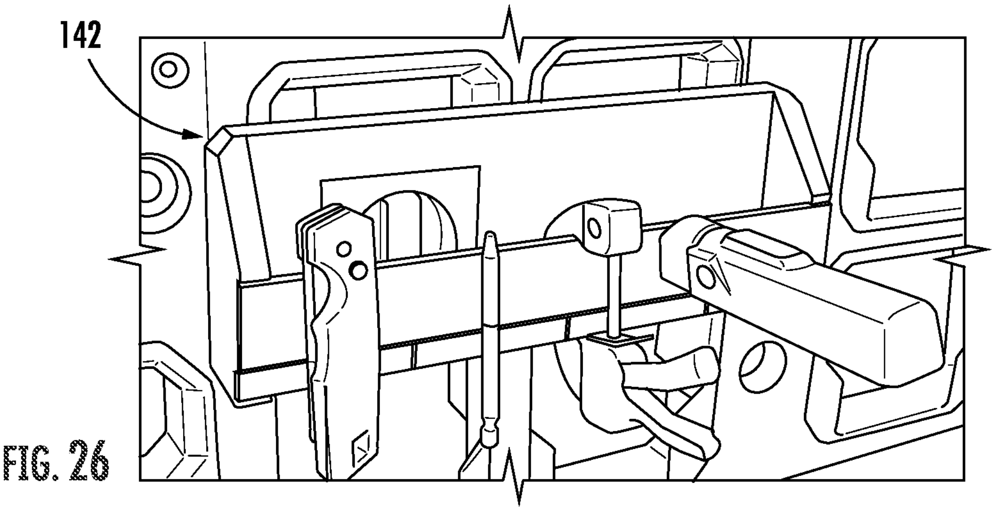

Referring to FIGS. 11, 12A and 12B, support mechanism 600 is configured to couple to a modular system and store objects, such as fasteners (e.g., screws).

In various embodiments, the rear of support mechanism 600 has a coupling structure configured to releasably engage with female couplers and compatible with the coupling mechanism(s) described in International Patent International Patent Publication No. WO 2017/191628, which is incorporated by reference in its entirety. In particular, the coupling component on the rear surface of the support mechanism 600 (FIG. 11) includes a plurality of protrusions that extend radially away from a center of the coupling cylinder, the plurality of protrusions extending circumferentially around with cylinder at a varying height with respect to a top of the cylinder, thereby facilitating coupling and decoupling the bin from a female coupling component.

In various embodiments, support mechanism 600 includes a base 610 defining a back surface 612 and an opposing front surface 614, one or more sidewalls 620 extending from the front surface 614, the front surface 614 and the one or more sidewalls 620 defining a containment area 616 to house one or more fasteners 690 (e.g., bolts and nuts). The support mechanism 600 also includes a support structure 640 (e.g., a cylindrical protrusion) extending from the back surface 612, and a first protrusion 650 extending circumferentially around and from the support structure 640, the first protrusion 650 offset from and above the back surface 612.

The support mechanism 600 also includes a magnet 630, such as coupled to the base 610. In various embodiments, the base 610 itself is magnet 630. In various other embodiments, base 610 encloses magnet 630, such as within a housing within base 610 (e.g., FIG. 12B). FIG. 12B depicts a schematic of a cross-section through a middle of support mechanism 600.

In various embodiments, the support mechanism 600 includes at least three protrusions 650 including the first protrusion 650, with each of the at least three protrusions 650 extending circumferentially around and from the support structure 640, and each of the at least three protrusions 650 offset from and above the back surface 612. In various embodiments, the at least three protrusions 650 are arranged symmetrically around support structure 640.

In a specific embodiment, a storage system includes one or more panels (e.g., as shown in FIG. 1) that include a plurality of female couplers configured to couple with male couplers (e.g., male coupler 800). The storage system further includes support mechanism 600.

Referring to FIGS. 13-19, support platforms 130, 131, 132, and 133 are shown. Support platforms 130, 131, 132, and 133 are configured to couple within a modular system and support and/or receive objects, such as tools.

Referring to FIGS. 20-26, various aspects of support platform 140 and support platform 142 are shown. Support platform 140 and support platform 142 are configured to couple within a modular system and support objects, such as the belt clip of a tape measure 141.

In various embodiments the design includes a magnetic strip on the belt clip rail.

Figure 27:
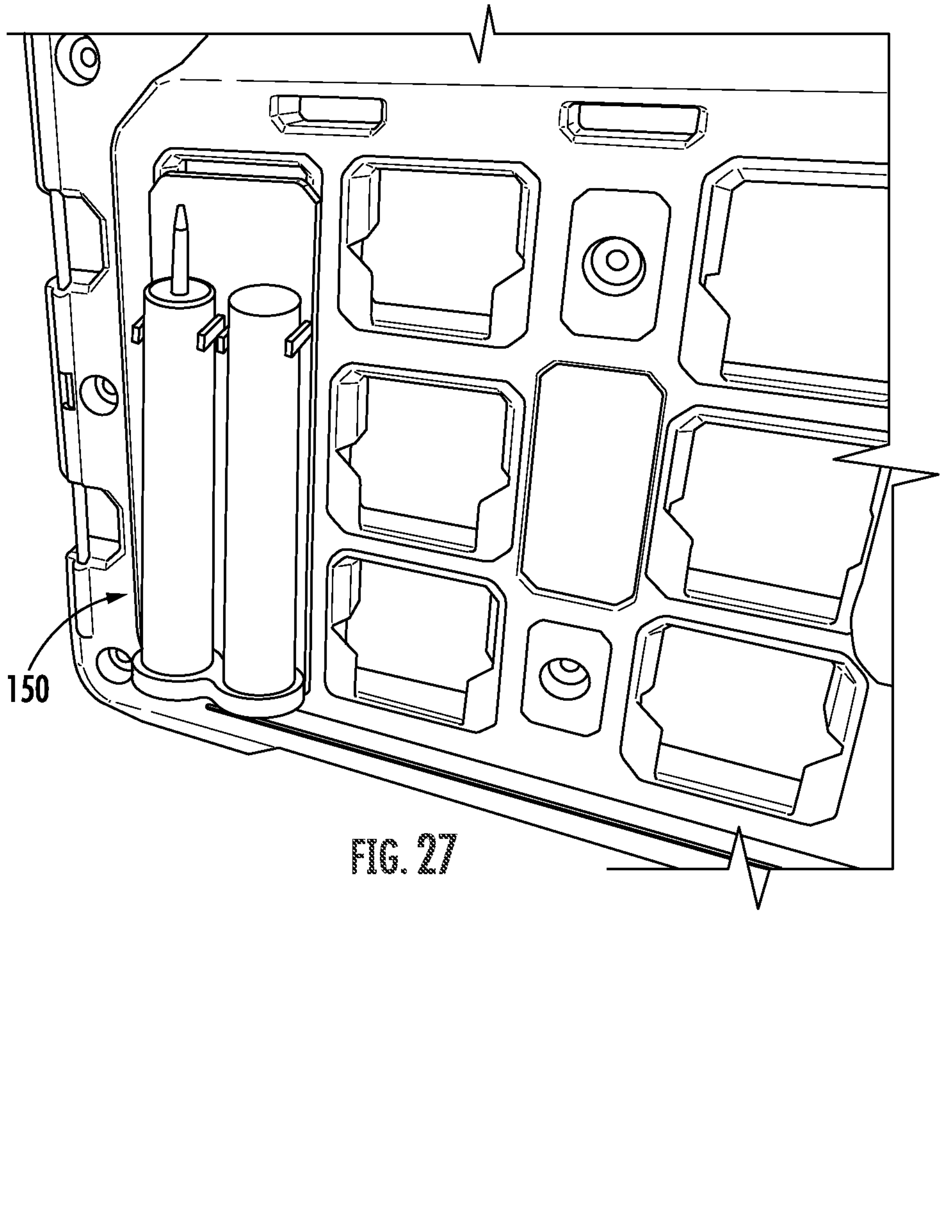
FIG. 27 is a perspective view of a support platform configured to couple to a modular system, according to an exemplary embodiment.
Figure 28:
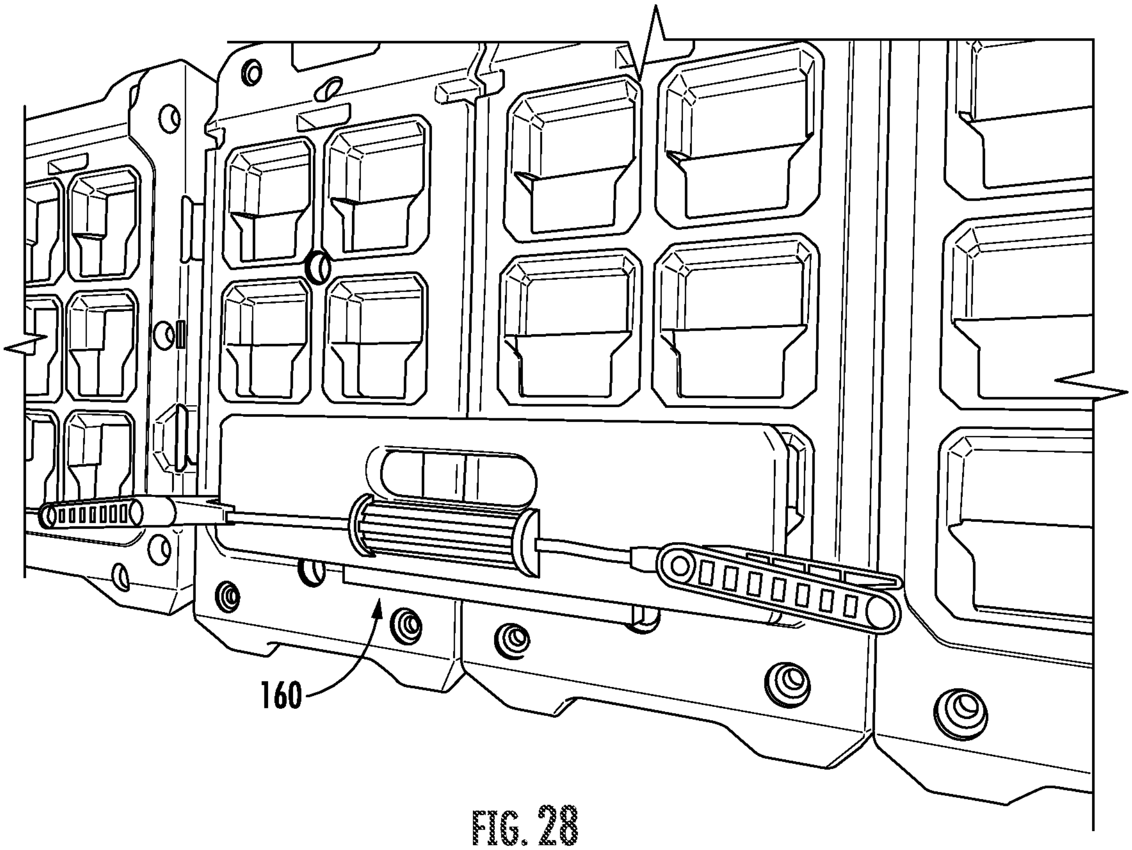
FIG. 28-32 are several views of a support platform, according to an exemplary embodiment.
Figure 29:
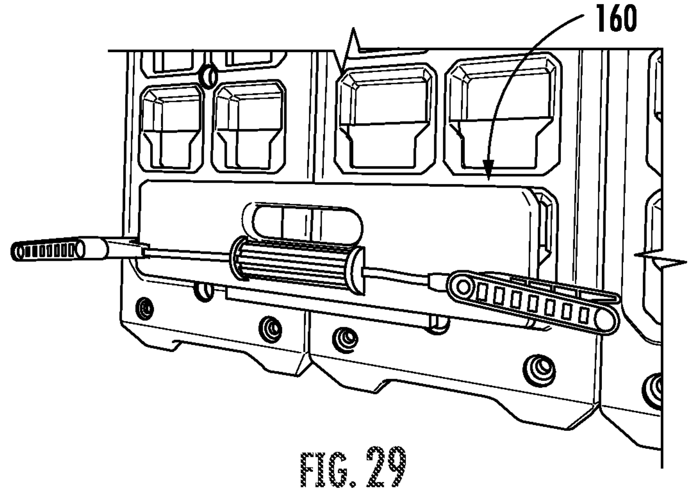
Figure 30:
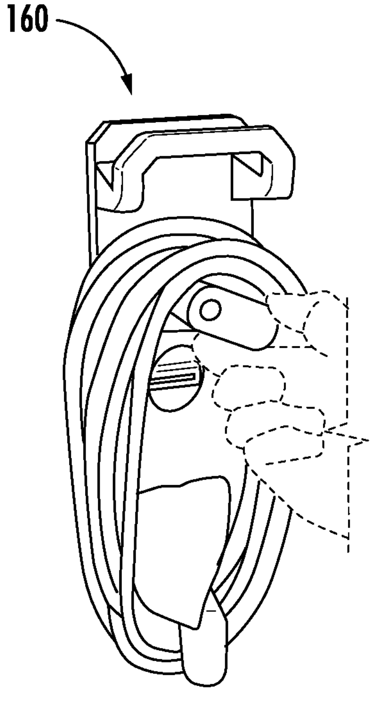
Figure 31:
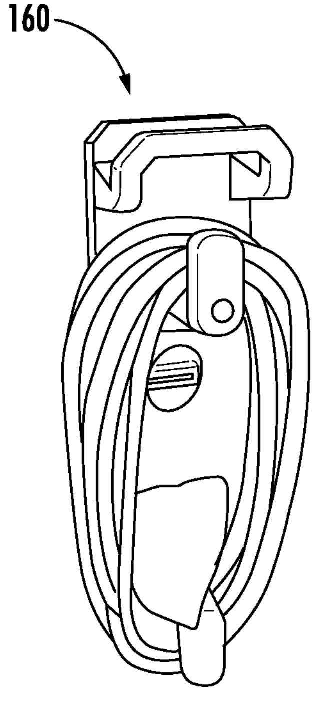
Figure 32:
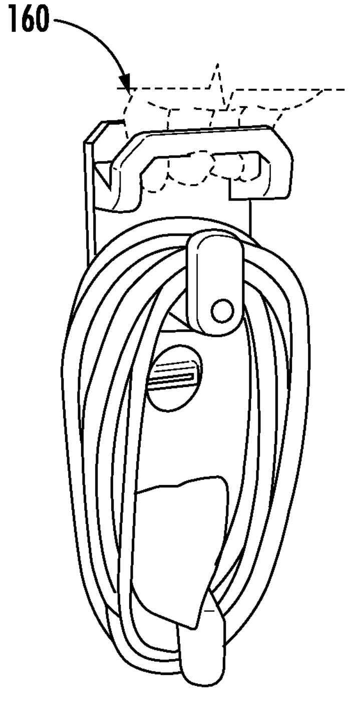

Referring to FIG. 27, support platform 150 is configured to couple within a modular system and receive objects, such as cylindrical objects.

Referring to FIGS. 28-32, various aspects of support platform 160 are shown. Support platform 160 is configured to couple within a modular system and receive an elongate flexible structure, shown as a cord (e.g., a power cord).

In regard to the Hose/Cord Wrap design, the embodiment shown covers a 1×3 grid of female couplers that are vertical with respect to each other. The embodiment shown is configured to attach to a wall and to be removed from the wall with the cord still wrapped around the hooks.

Figure 33:
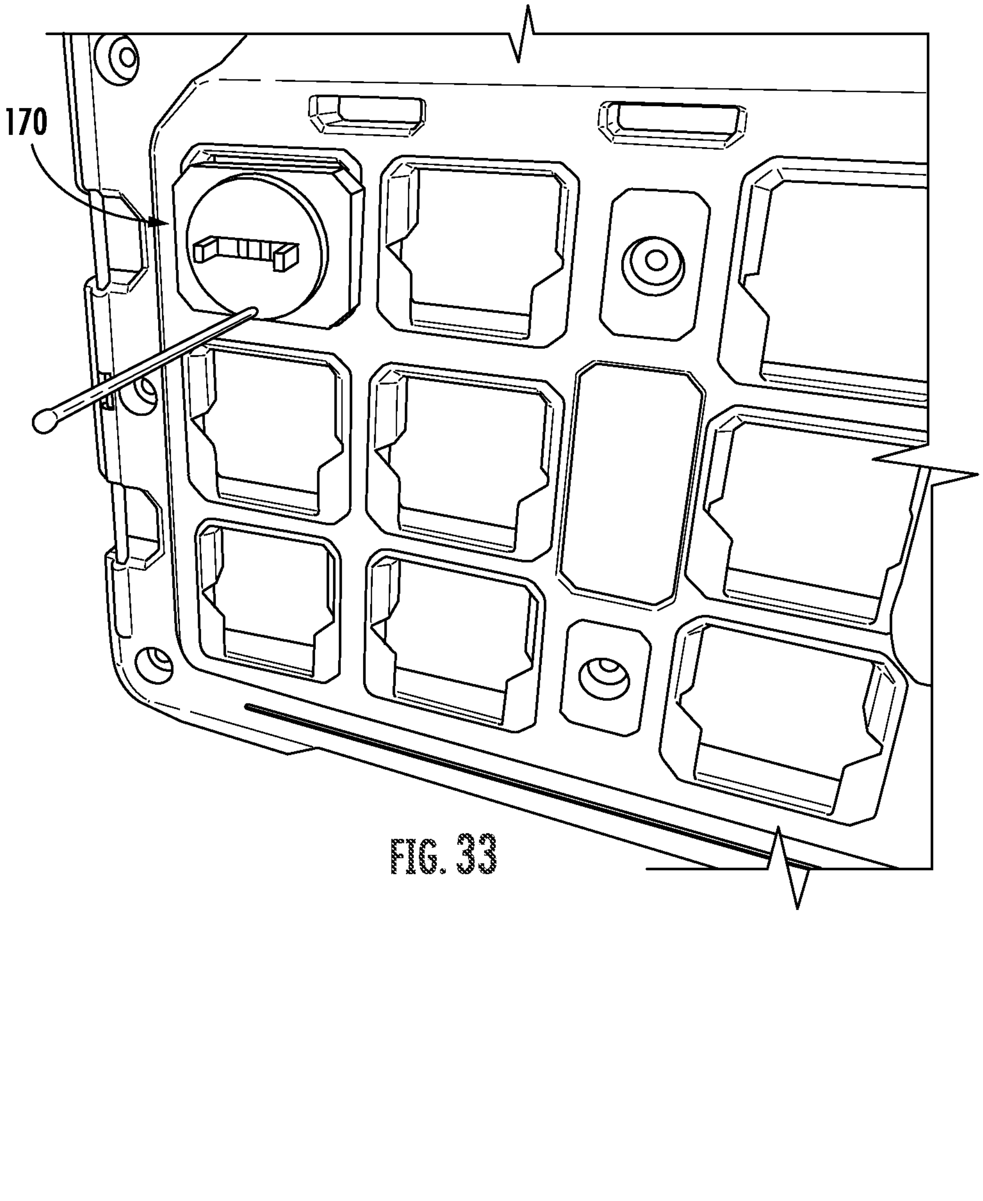
FIG. 33 is a perspective several view of a support platform configured to couple to a modular system, according to an exemplary embodiment.
Figure 34:
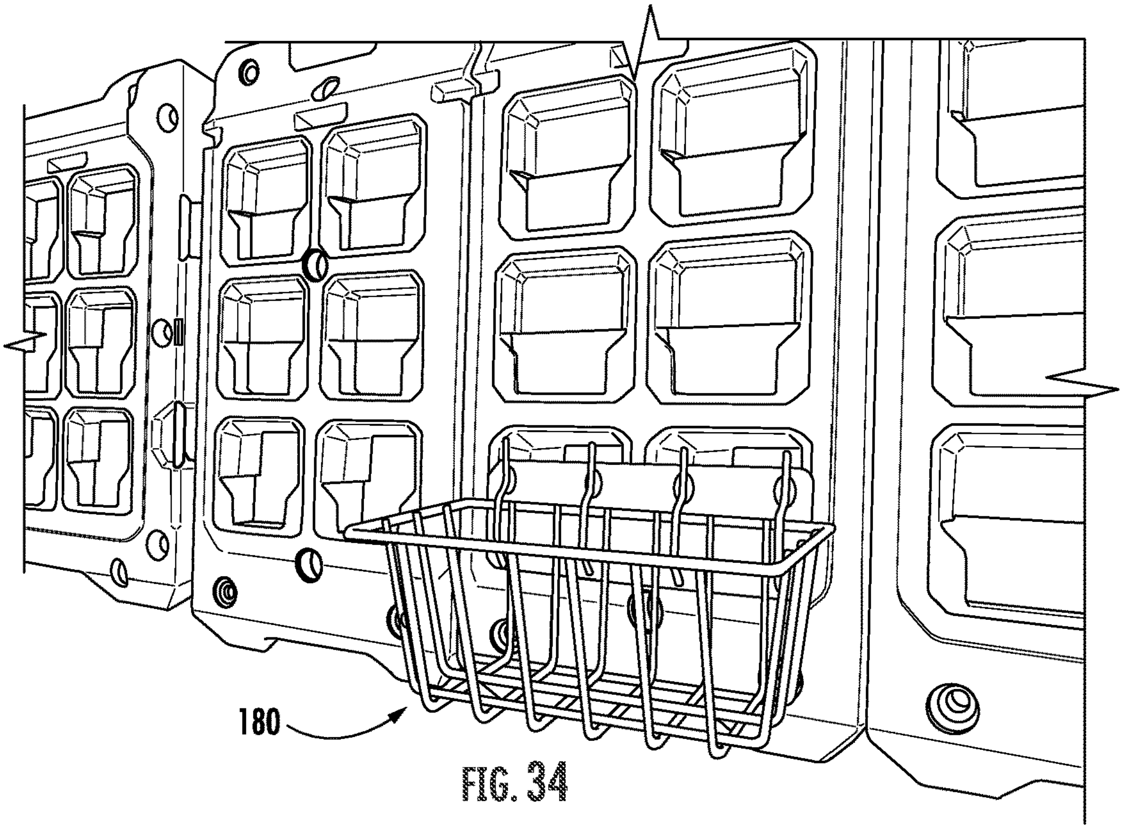
FIGS. 34-37 are several views of containers configured to couple to a modular system, according to exemplary embodiments.
Figure 35:
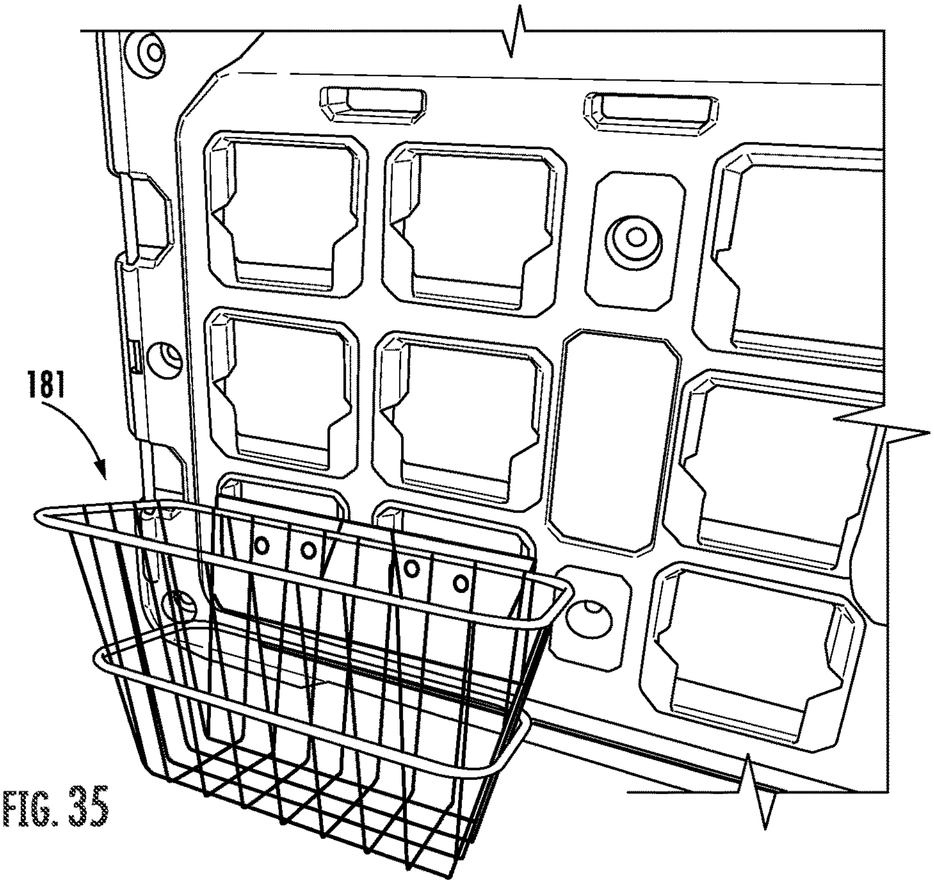
Figure 36:
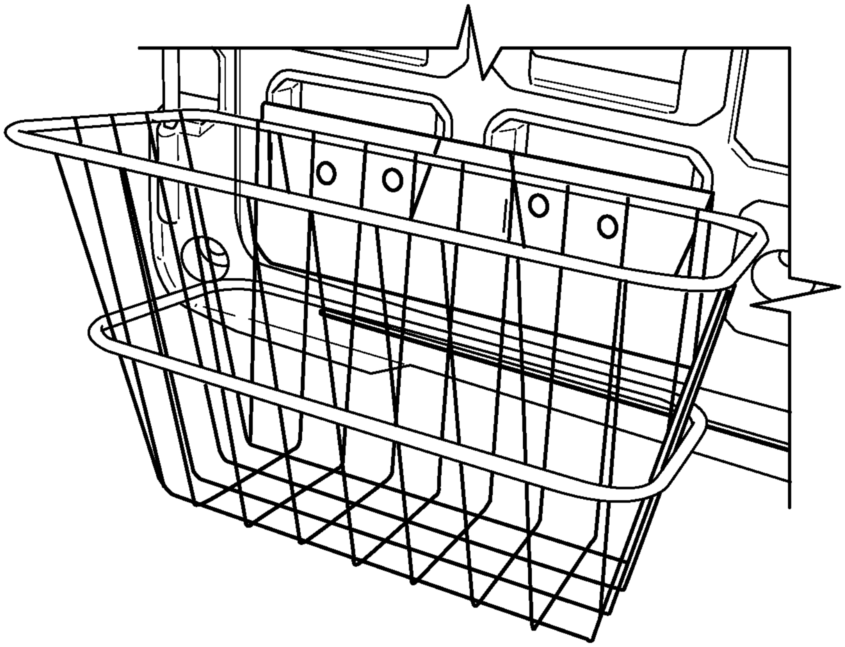
Figure 37:
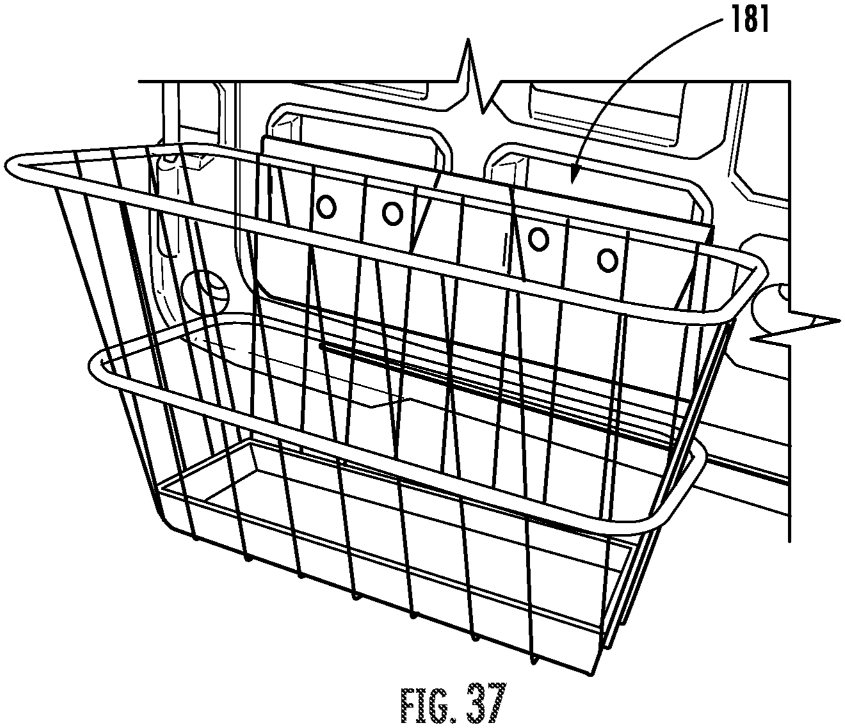

Referring to FIG. 33, various aspects of support platform 170 are shown. Support platform 170 includes a swiveling mechanism with the hook offset from center of the swivel, thereby allowing the user to swivel the hook to various locations. In this way, support structure 170 can be adjusted to avoid interfering with neighboring devices within the modular system.

Referring to FIGS. 34-37, various aspects of container 180 and container 181 are shown.

In regard to the Wire Basket design, in various embodiments the bottom is a solid component with a bit of a lip (e.g., vertical or mostly vertical walls) that extends upward around a periphery of the lower plate, thereby containing smaller objects within the wire basket design.

Figure 38:
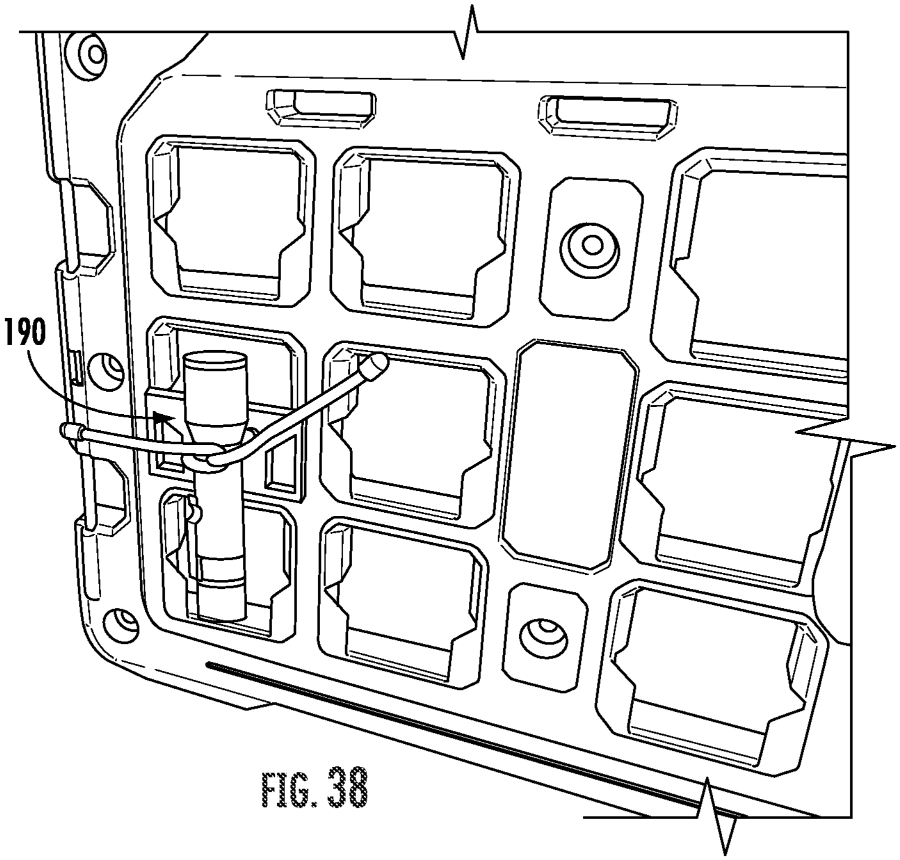
FIGS. 38-39 are several views of a coupling and support platform configured to couple to a modular system, according to an exemplary embodiment.
Figure 39:
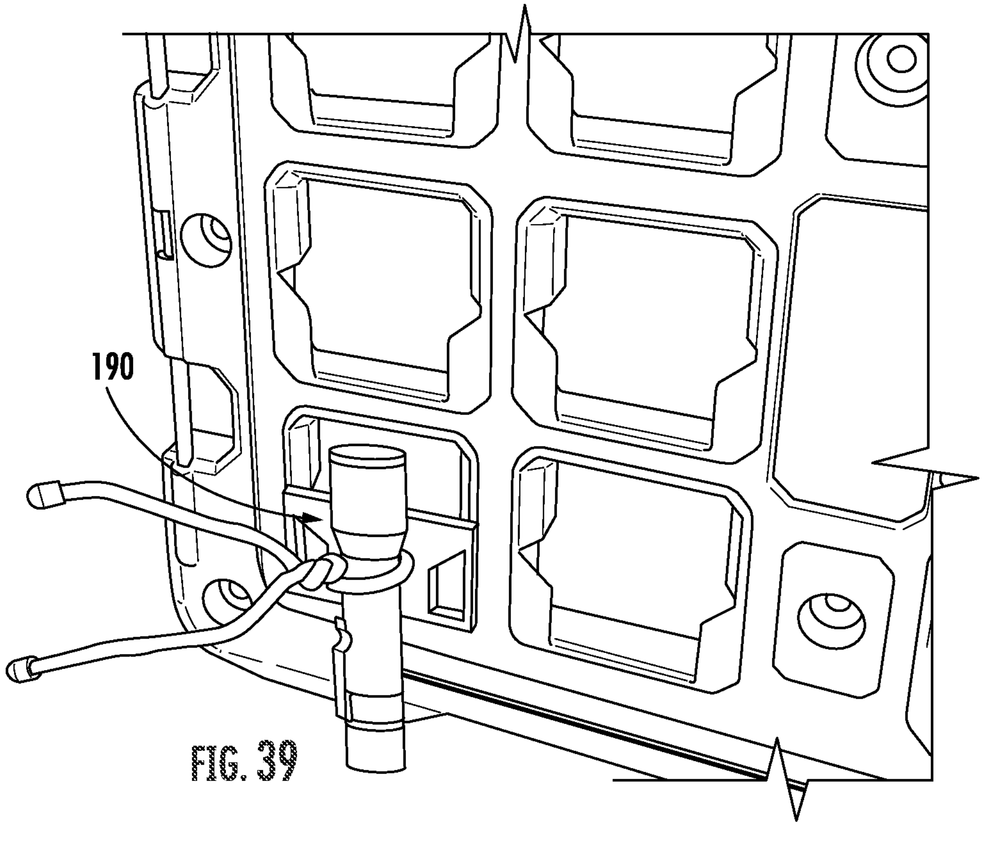
Figure 40:
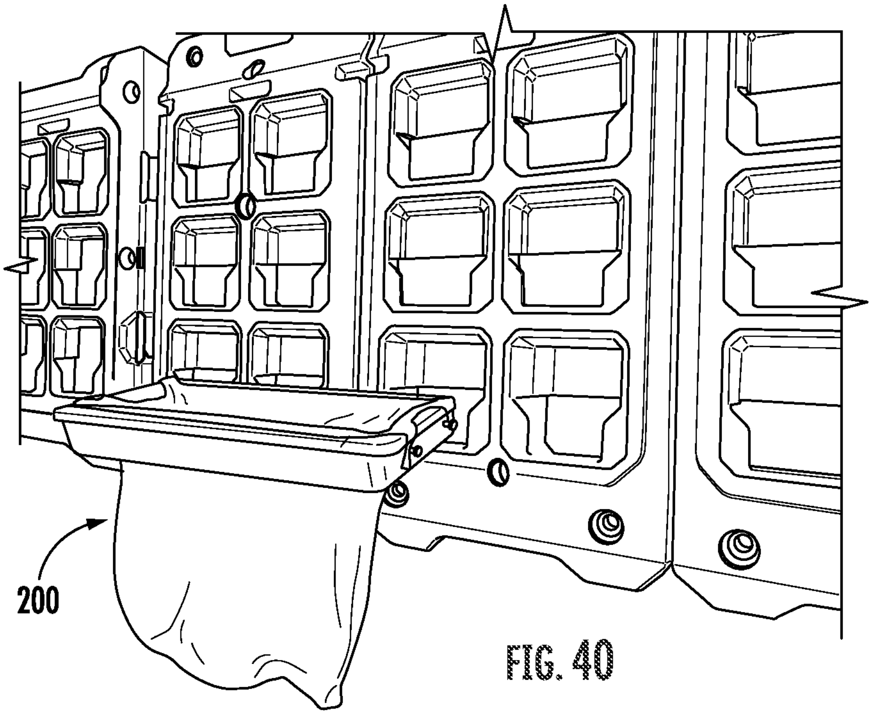
FIGS. 40-45 are several views of support platforms configured to couple to a modular system, according to exemplary embodiments.
Figure 41:
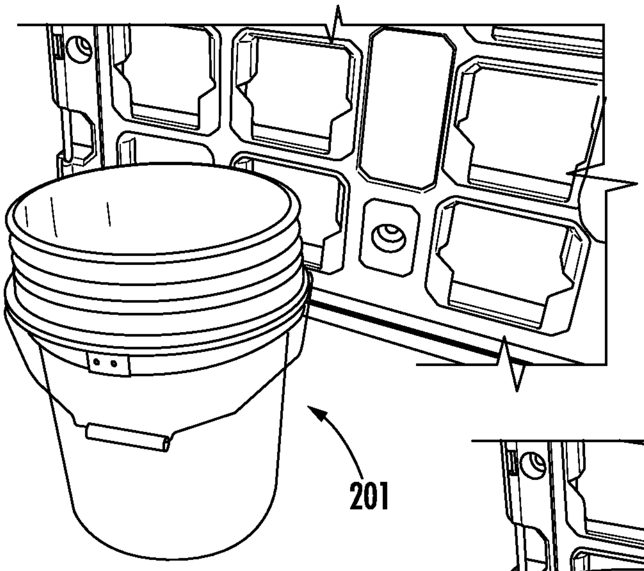
Figure 42:
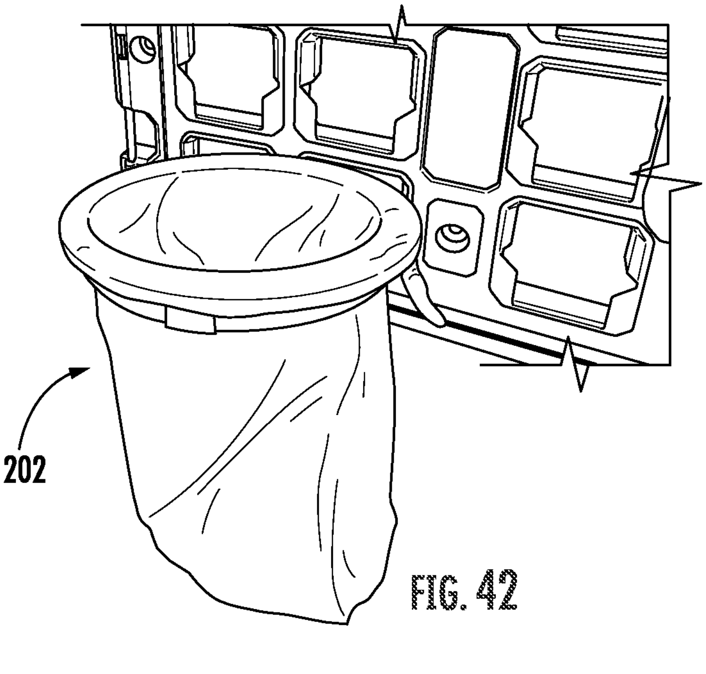
Figure 43:
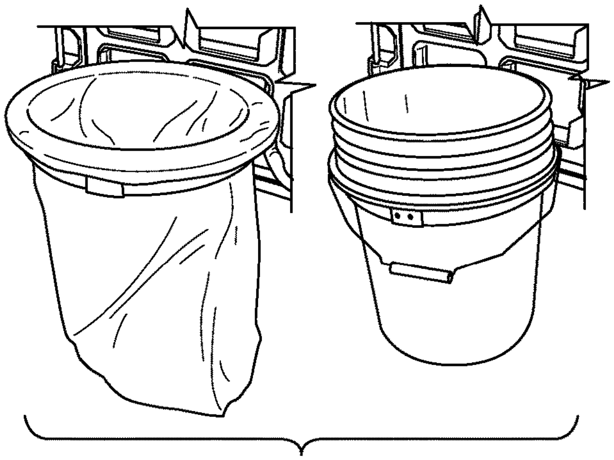

Referring to FIGS. 38-39, various aspects of coupling and support platform 190 are shown. Coupling and support platform 190 includes one or more elongate structures, shown as arms, that are flexible and also biased to remain static. In this way, the arms can be wrapped around objects to be supported by coupling and support platform 190.

Referring to FIGS. 40-45, various aspects of support platforms and/or support mechanisms are shown. Support platform 200, support platform 201, support platform 202 and support mechanism 500 are configured to engage within a modular system and support a container, such as a bucket and/or a bag, configured to receive objects, such as trash.

In various embodiments there is no latch that couples the support platform to the wall of coupling devices. In various embodiments the backing covers a 2×3 grid of female couplers, which has a higher weight limit compared to other designs (e.g., 1×2 design).

Figure 44:
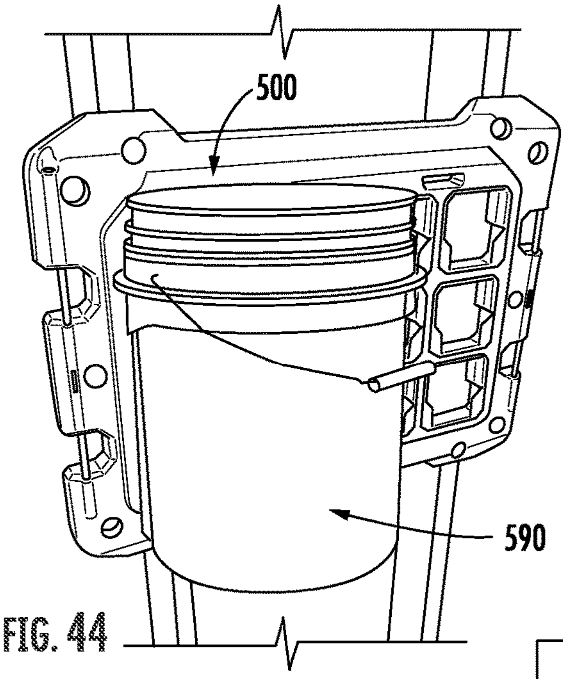
Figure 45:
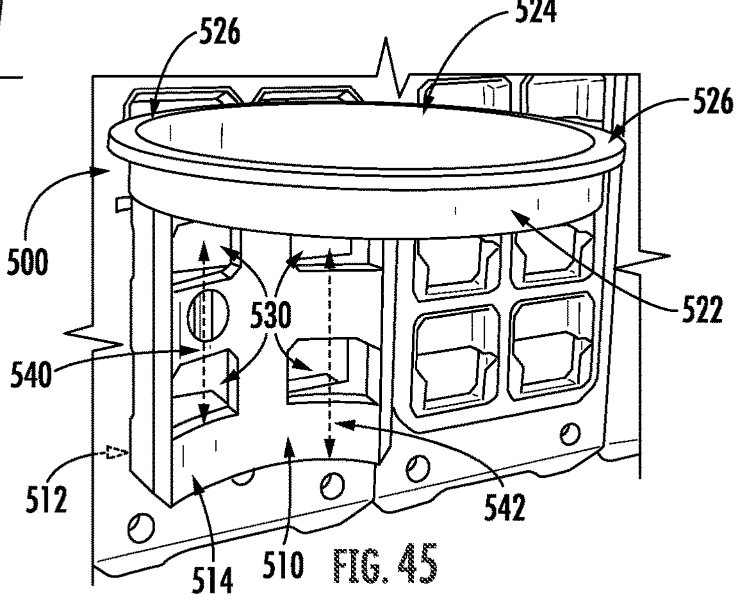

Referring to FIGS. 44-45, in various embodiments, support mechanism 500 includes a base 510 defining a back surface 512 and an opposing front surface 514, a support structure 520 extending forward from the front surface 514. The support structure 520 includes a curved support element 526, the support element 526 defining an internal receiving area 524 configured to receive a cylindrical container (e.g., bucket 590), and a plurality of male couplers 530 extending from the back surface 512. In various embodiments, the male coupler(s) extending from back surface 512 are structurally and functionally the same or similar to male coupler 800 shown in FIGS. 74-75.

In various embodiments, the support element 526 defines a circular shape. In various embodiments, the support element 526 includes a curved outer portion 522 that is the portion of support element 526 furthest from front surface 514, and curved outer portion 522 defines a concave shape with respect to front surface 514. For example, curved outer portion represents the one-third of support element 526 that is furthest from front surface 514.

In various embodiments, the plurality of male couplers 530 are arranged in a grid. For example, the grid comprises at least two columns (e.g., first column 540 and second column 542) that each include at least two male couplers 530. As another example, the grid includes at least two columns (e.g., first column 540 and second column 542) that each includes at least three male couplers 530.

In a specific embodiment, a storage system includes one or more panels (e.g., as shown in FIG. 44) that include a plurality of female couplers configured to couple with male couplers (e.g., male coupler 800). The storage system further includes support mechanism 500, and optionally a container (e.g., bucket 590).

Figure 69:
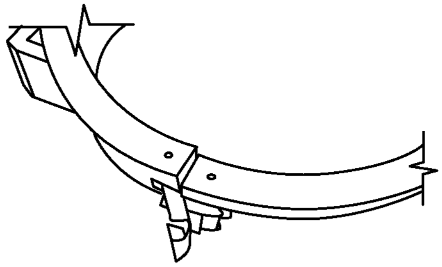
FIGS. 69-70 are several perspective views of a coupling platform configured to couple to a modular system, according to an exemplary embodiment.
Figure 70:
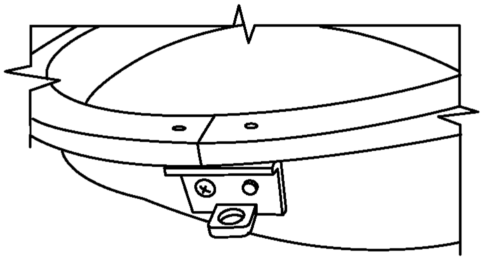

In an alternate embodiment, the support structure of support mechanism 500 includes one or more detachable elements, such as arcs of a circle (such as similar to or the same as shown in FIGS. 69-70).

Figure 46:
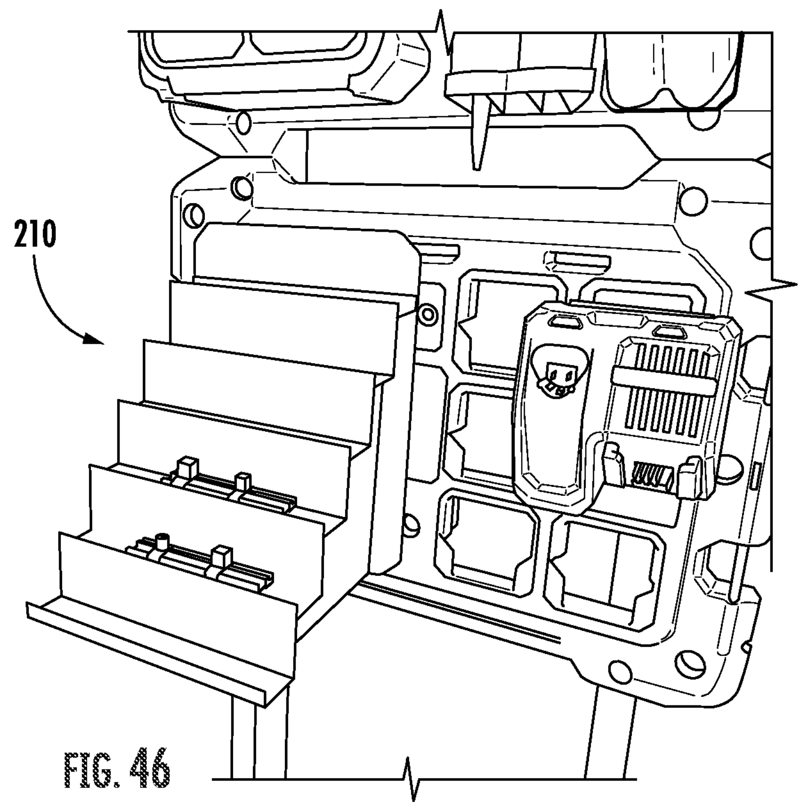
FIGS. 46-47 are several views of support platforms configured to couple to a modular system, according to exemplary embodiments.
Figure 47:
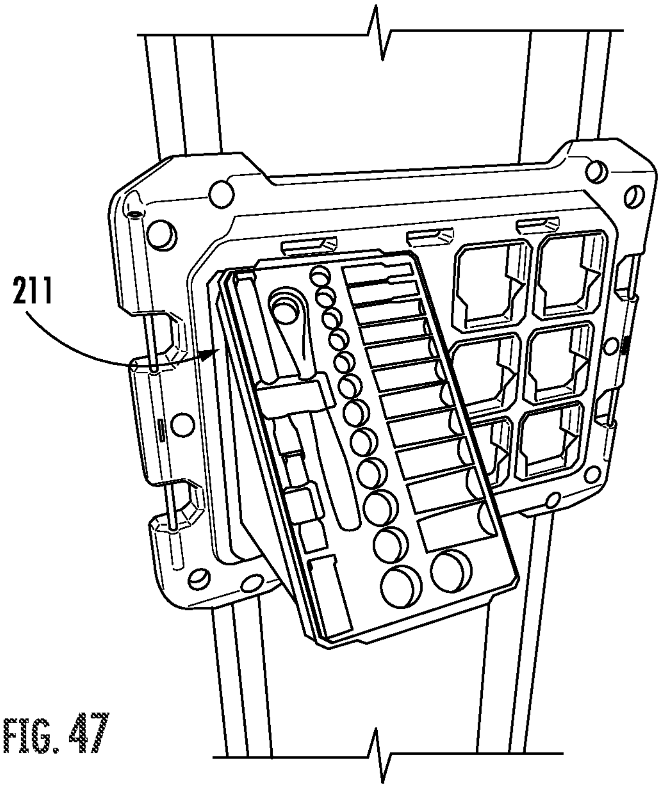

Referring to FIGS. 46-47, various aspects of support platforms 210 and 211 are shown. Support platforms 210 and 211 are configured to couple within a modular system and provide a support structure, such as a platform, for various tools, such as sockets and/or hand tools.

Figure 50:
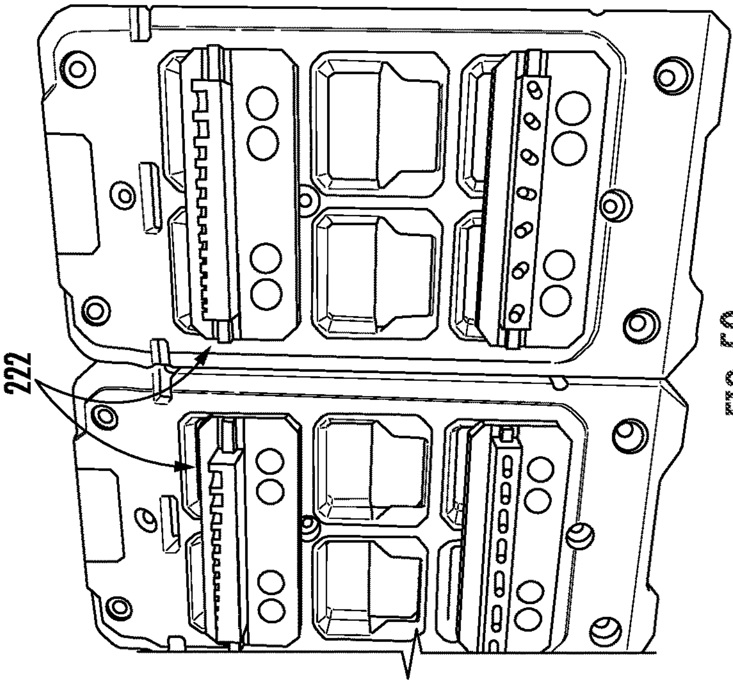
FIGS. 48-50 are several views of support platforms configured to couple to a modular system, according to exemplary embodiments.
Figure 49:
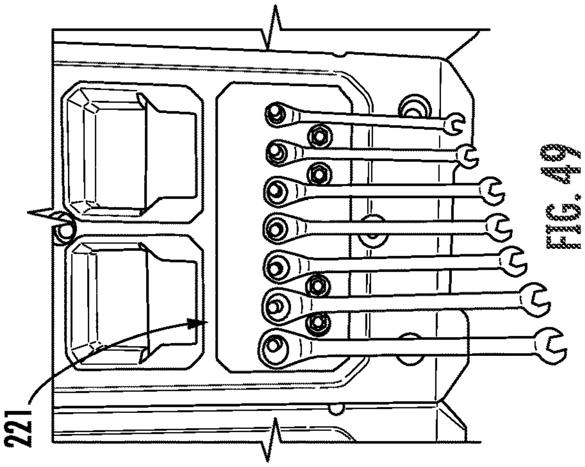
Figure 48:
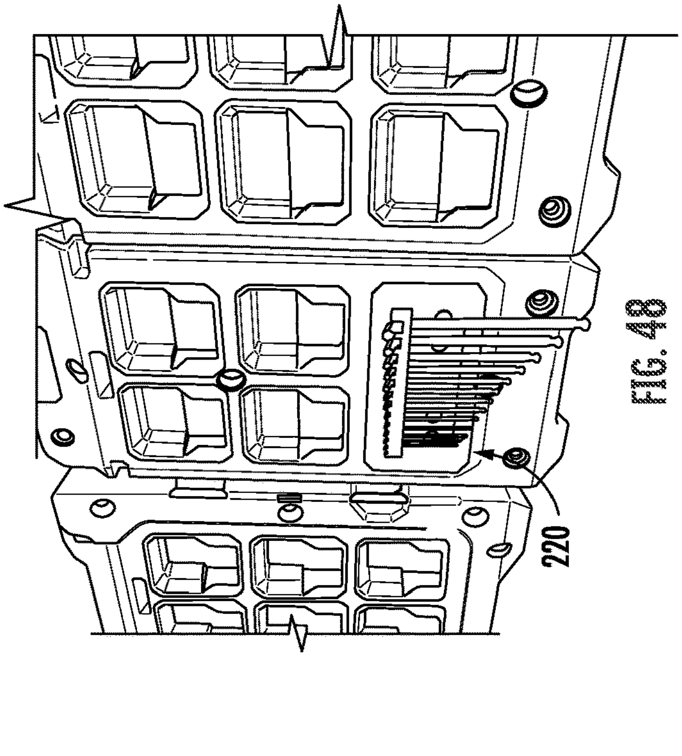

Referring to FIGS. 48-50, various aspects of support platform 220, support platform 221 and support platform 222, are shown. In various embodiments, each of support platform 220, 221 and 222 are configured to couple within a modular system, such as a plate hanging on a wall that includes coupling mechanisms, shown as female couplers. In various embodiments, support platform 222 includes a dovetail attachment mechanism configured to receive various embodiments of tool holders (FIG. 50).

Figure 52:
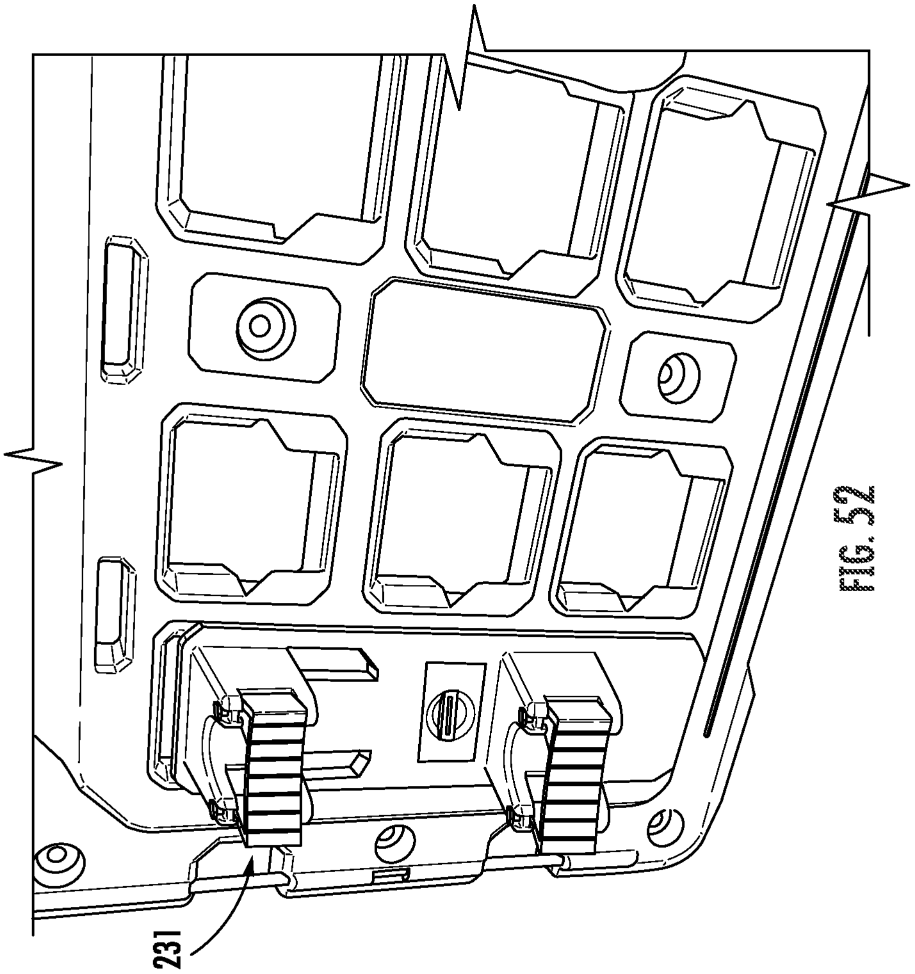
FIGS. 51-53 are several views of a coupling platform configured to couple to a modular system, according to an exemplary embodiment.
Figure 51:
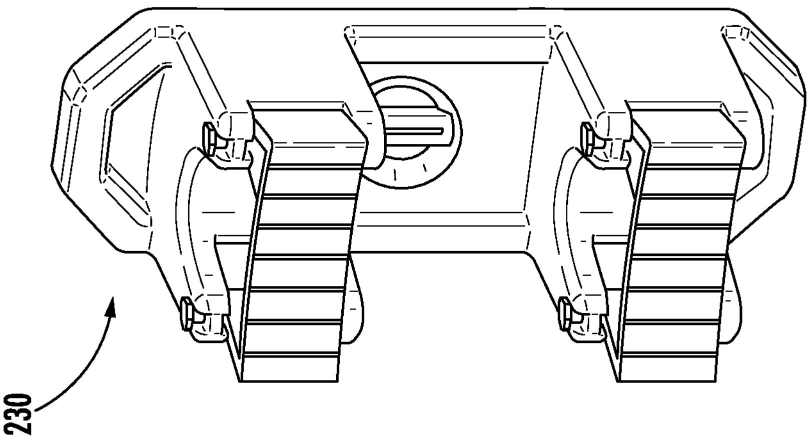
Figure 53:
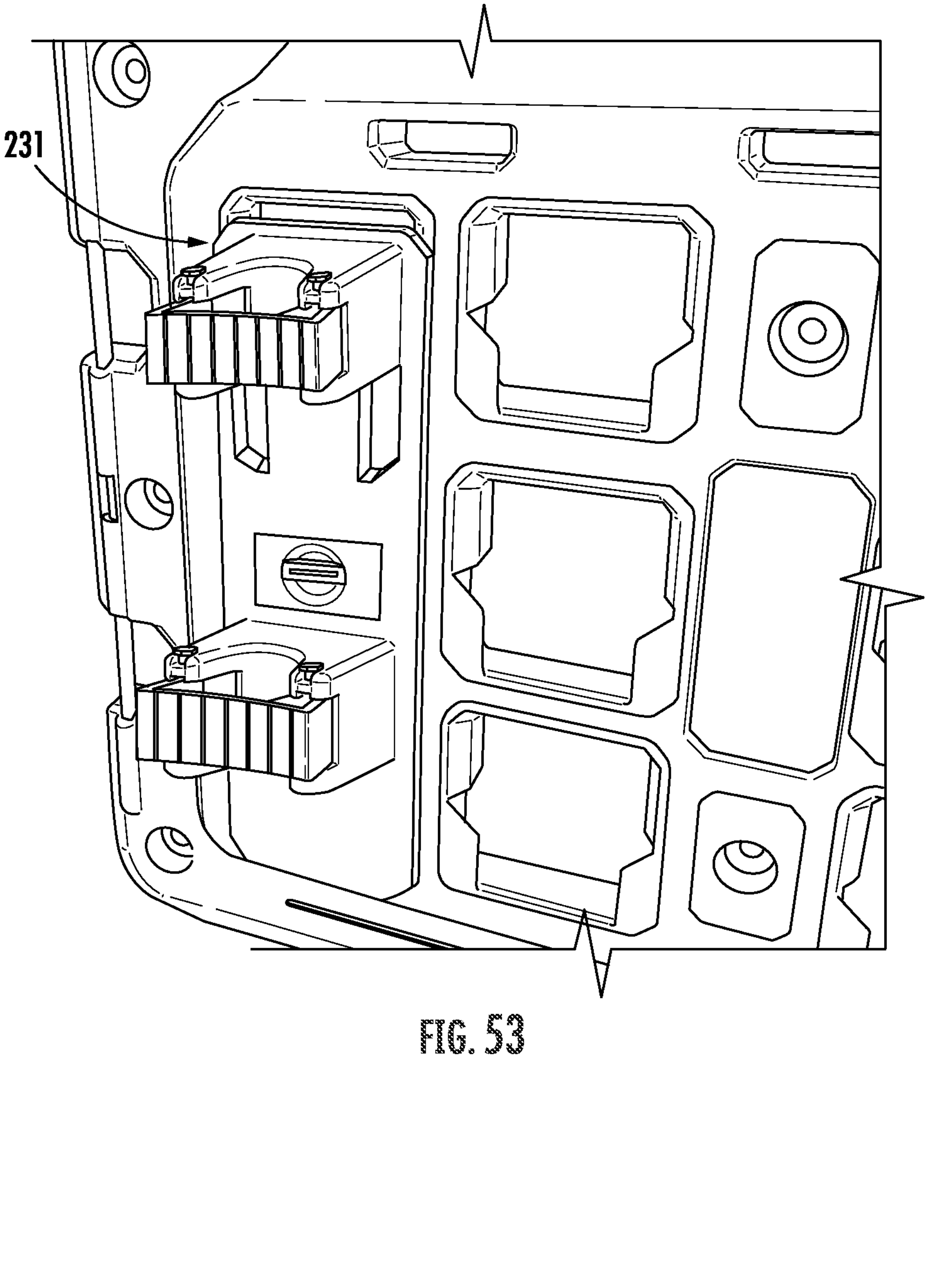

Referring to FIGS. 51-53, various aspects of support platform 230 and 231 are shown coupled to a plate extending from a surface, shown as a wall.

Figure 54:
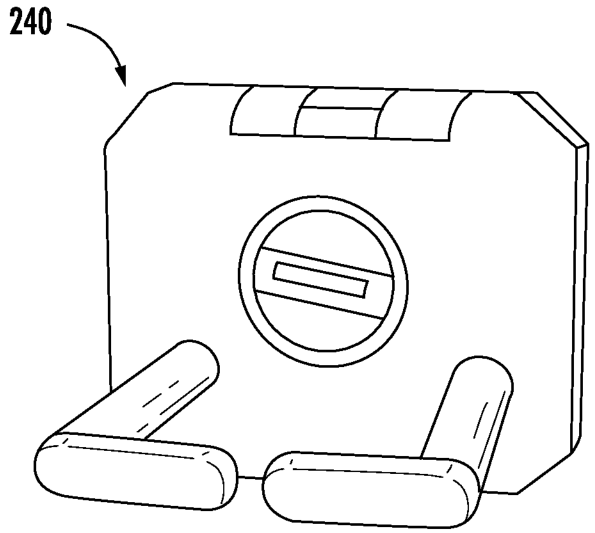
FIGS. 54-56 are several views of a coupling and support platform, according to an exemplary embodiment.
Figure 55:
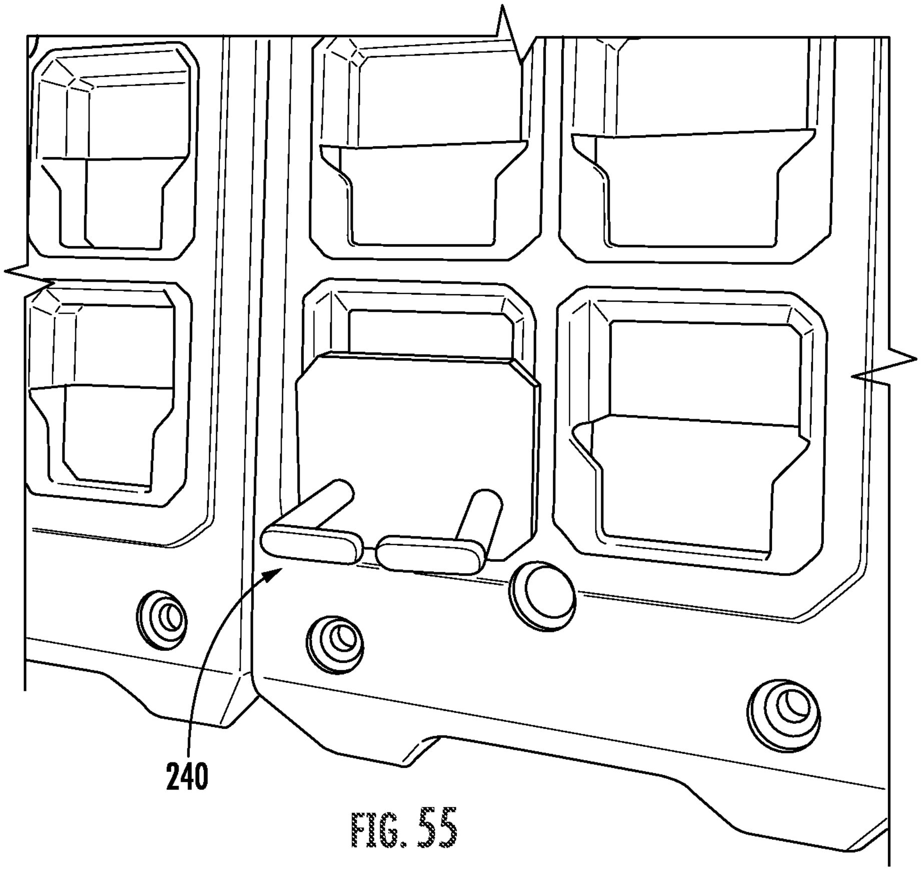
Figure 56:
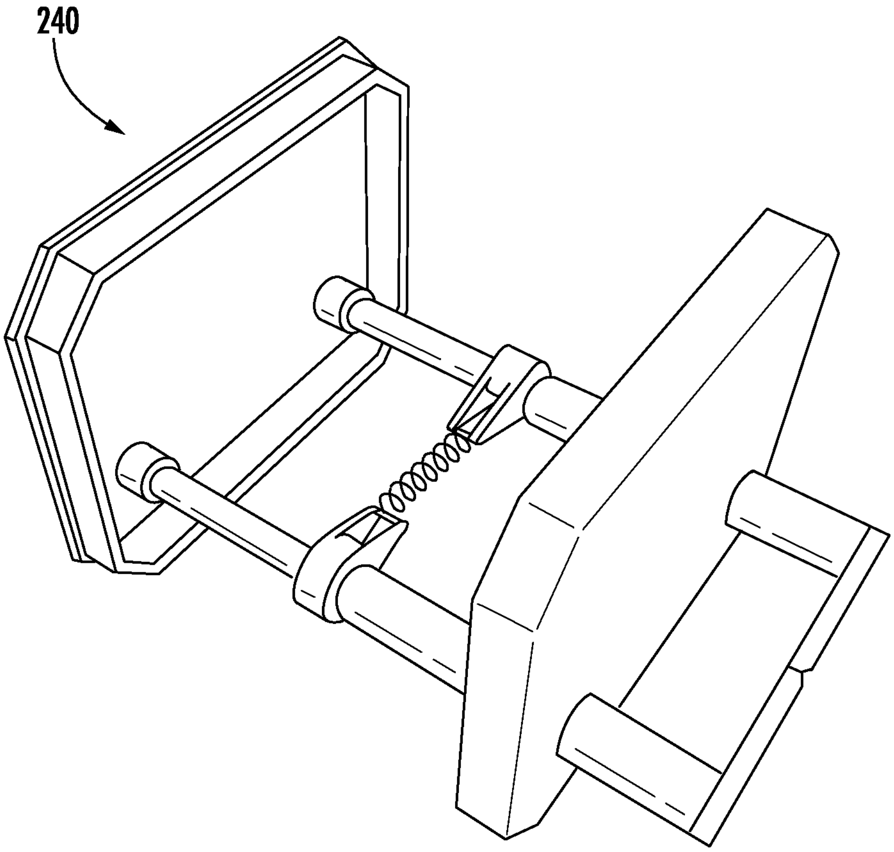
Figure 57:
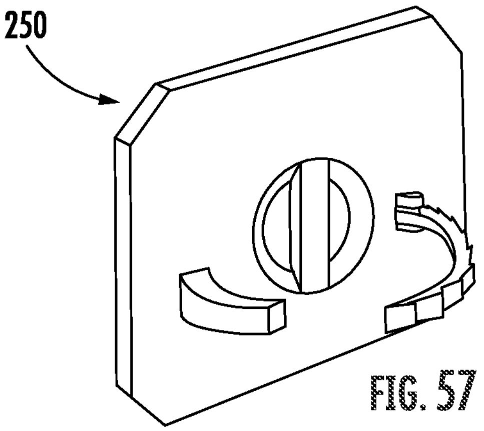
FIGS. 57-62 are several views of coupling platforms configured to couple to a modular system, according to exemplary embodiments.
Figure 58:
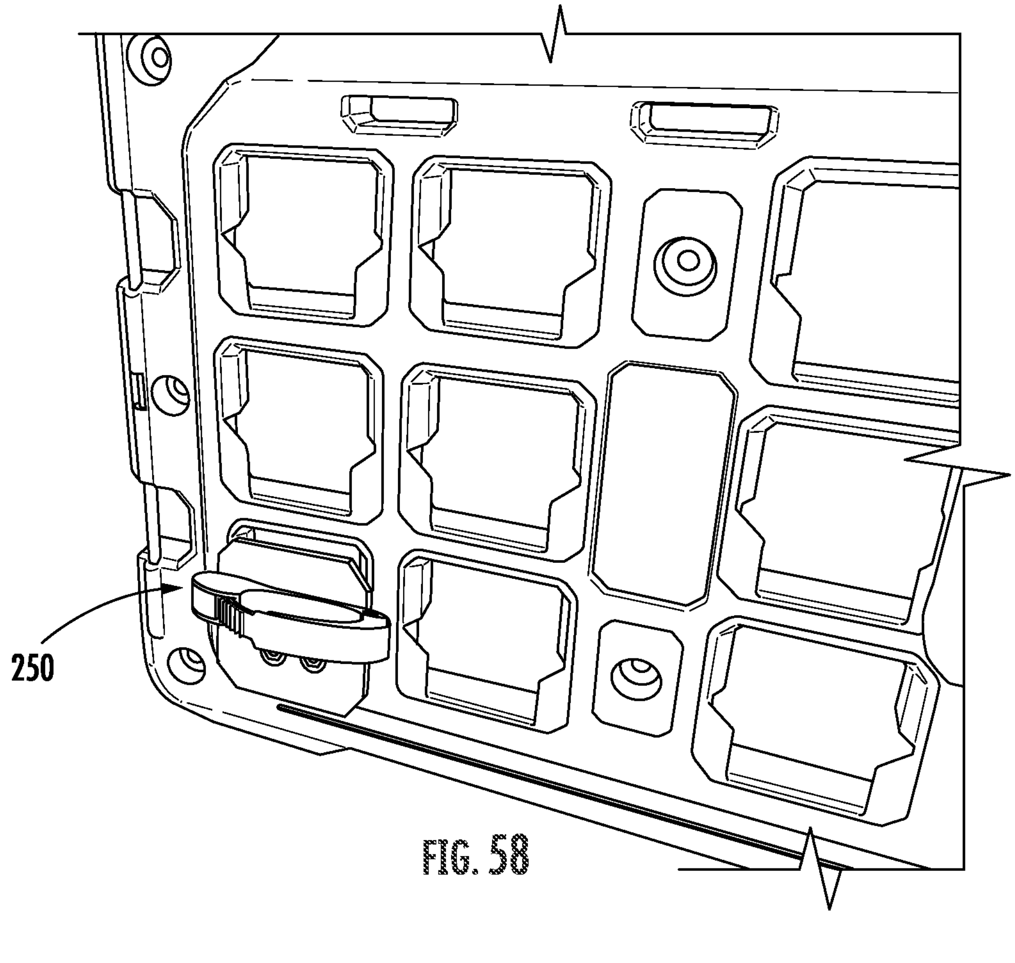
Figure 59:
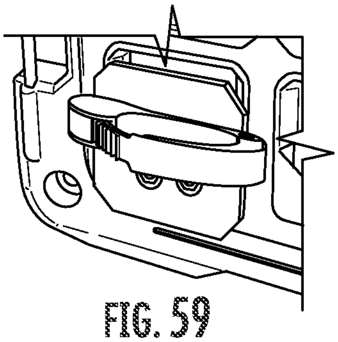
Figure 60:
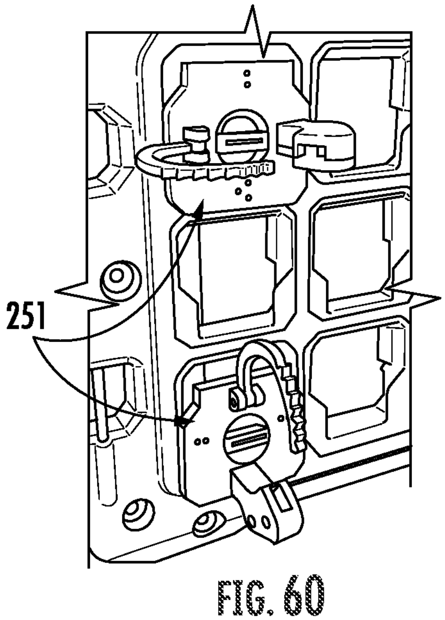
Figure 61:
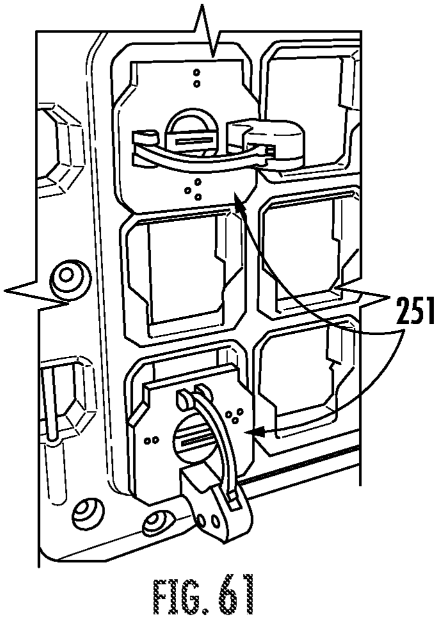

Referring to FIGS. 54-56, various aspects of coupling and support platform 240 are shown. Coupling and support platform 240 includes two hooks extending laterally away from coupling and support platform 240. The two hooks are biased, such as by being spring loaded, downward. When loading a device, such as a tool, to coupling and support platform 240, the device is passed upward through the hooks thereby pushing the hooks up and away from each other. When the user releases the device the hooks rotate downward to close around the device, thereby supporting the device from falling. In various embodiments each arm rotates about a fixed post (FIG. 56).

Figure 62:
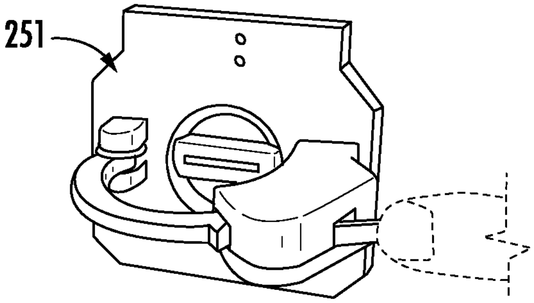

Referring to FIGS. 57-62, various aspects of coupling platform 250 and coupling platform 251 are shown. In various embodiments the arm with notches is configured to be received in the arm with the opening, thereby locking the arms together, to secure an object between the two arms. Once the arms are locked together, they can be released from each other by actuating a release, such as a lever (FIG. 62).

In various embodiments the coupling mechanism is split such that the hinge is on one side and the latch is on the other, thereby straddling the locking mechanism.

Figure 63:
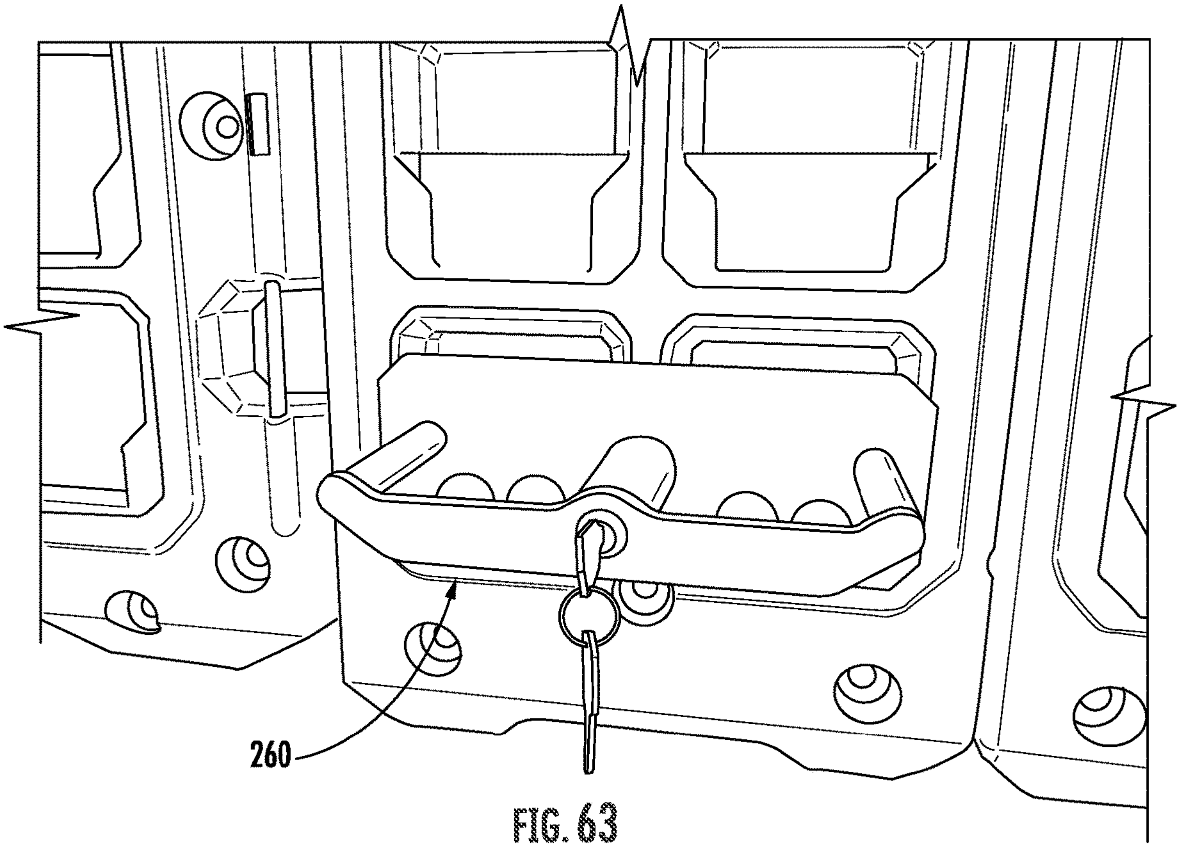
FIGS. 63-65 are several views of a coupling and support platform configured to couple to a modular system, according to an exemplary embodiment.
Figure 64:
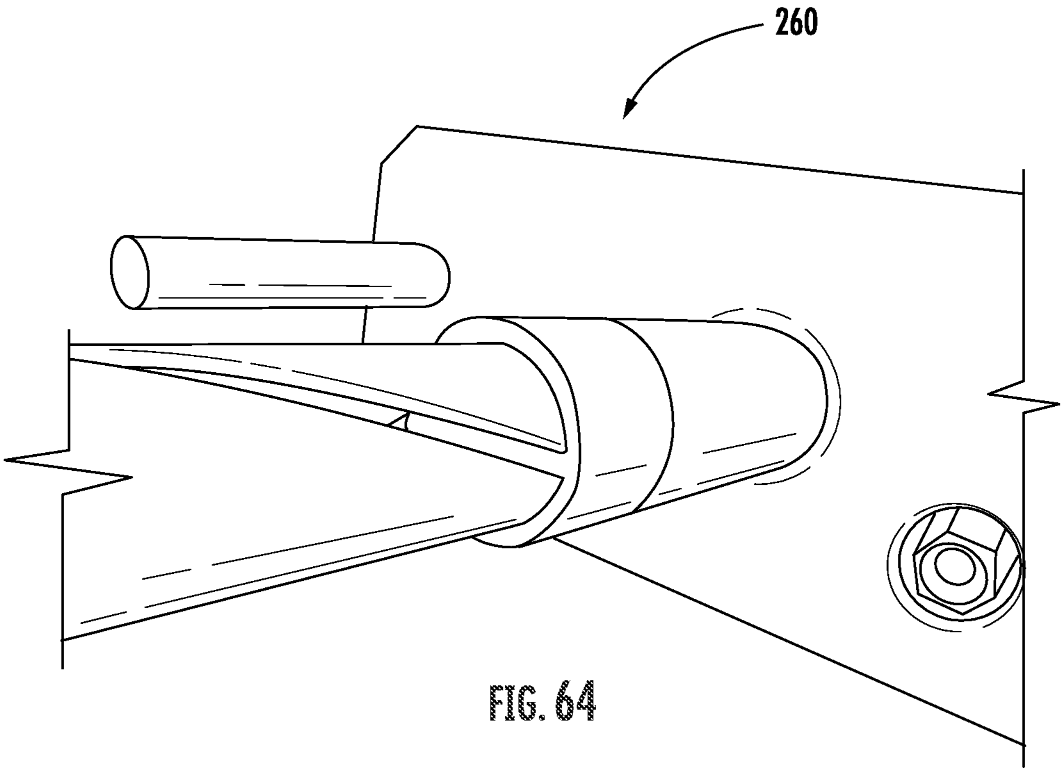
Figure 65:
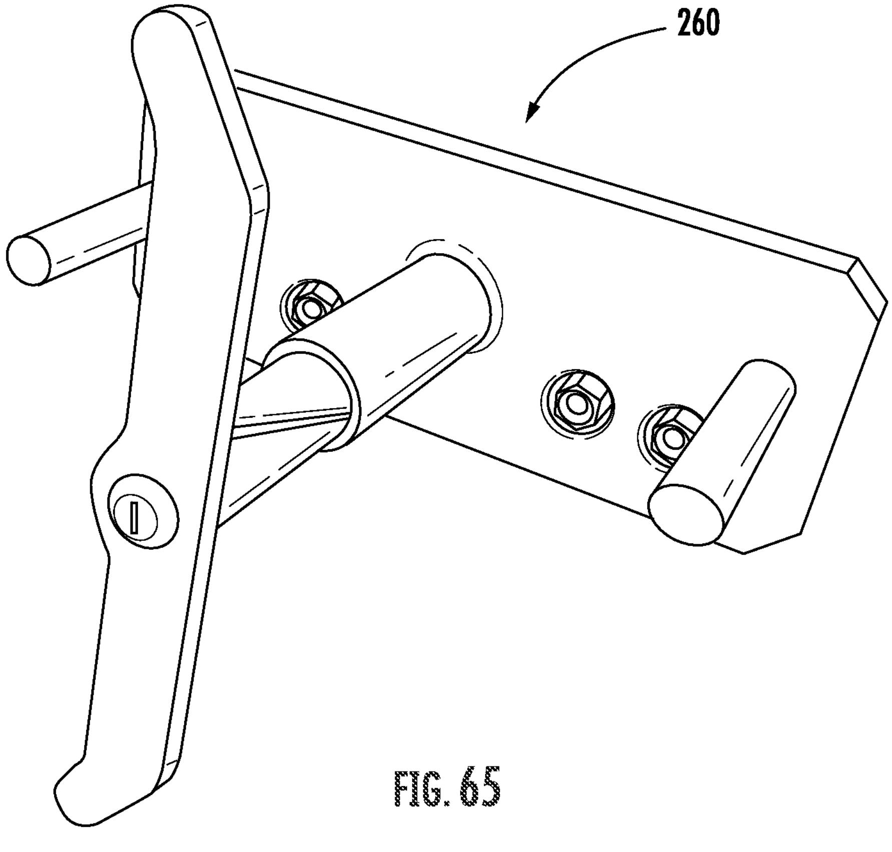

Referring to FIGS. 63-65, various aspects of securing and coupling platform 260 are shown. The central arm is pivotally coupled to a center of the body and extends in opposing directions. In various embodiments securing and coupling platform 260 includes two fixed arms fixedly coupled to either side of the body. When the central arm is in the locking position (FIG. 63), the central arm is above and/or interfacing against the fixed arms. The central arm is configured to be selectively locked in place, such as in the position shown in FIG. 63. In various embodiments, two pins travel along helical tracks when coupling platform 260 is in operation (FIG. 64). When unlocked, the central arm can be rotated to the vertical orientation (FIG. 65).

Figure 66:
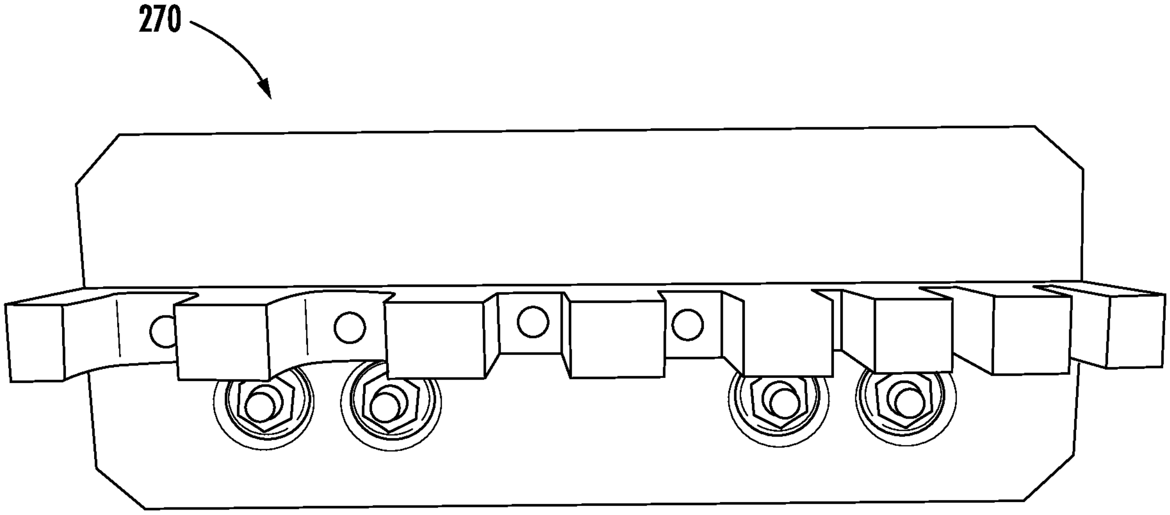
FIG. 66 is a perspective view of a coupling platform configured to couple to a modular system, according to an exemplary embodiment.

Referring to FIG. 66, various aspects of coupling platform 270 are shown. Coupling platform 270 is configured to be coupled within a modular system, such as to a plate secured to a wall, the plate including one or more coupling mechanisms, such as female couplers. In various embodiments coupling platform 270 includes one or more magnets to bias tools on the rack.

Figure 67:
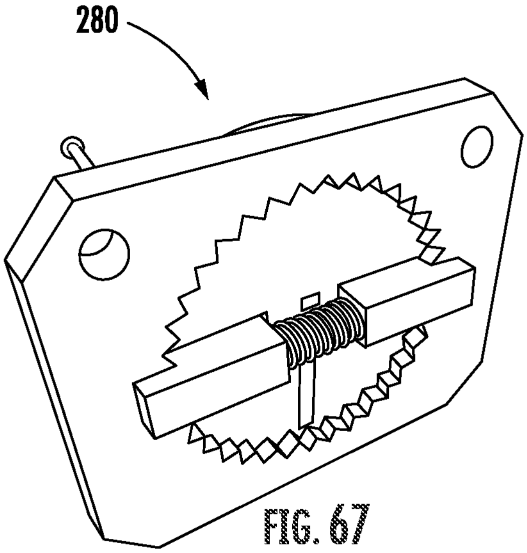
FIGS. 67-68 are several perspective views of a support platform configured to couple to a modular system, according to an exemplary embodiment.
Figure 68:
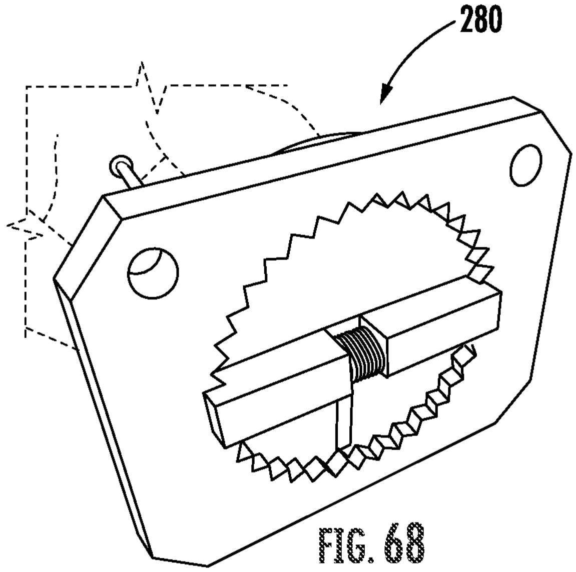

Referring to FIGS. 67-68, various aspects of coupling platform 280 are shown. Coupling platform 280 includes internal gears engaged by teeth on outwardly projecting fingers that correspond to fingers on the front of coupling platform 280. In various embodiments coupling platform 280 includes a biasing element, shown as a spring.

Referring to FIGS. 69-70, various aspects of coupling platform 290 are shown. In various embodiments coupling platform 290 is configured to engage around a container, such as a five gallon bucket. The securing mechanism, shown as a locking clip, is actuated to the unlocked position to receive the bucket, and then the securing mechanism is actuated to the locked position to secure the bucket within the coupling platform 290. In various embodiments the excess of a bag inserted in the bucket can be passed through the hoop to secure the bag.

Figure 71:
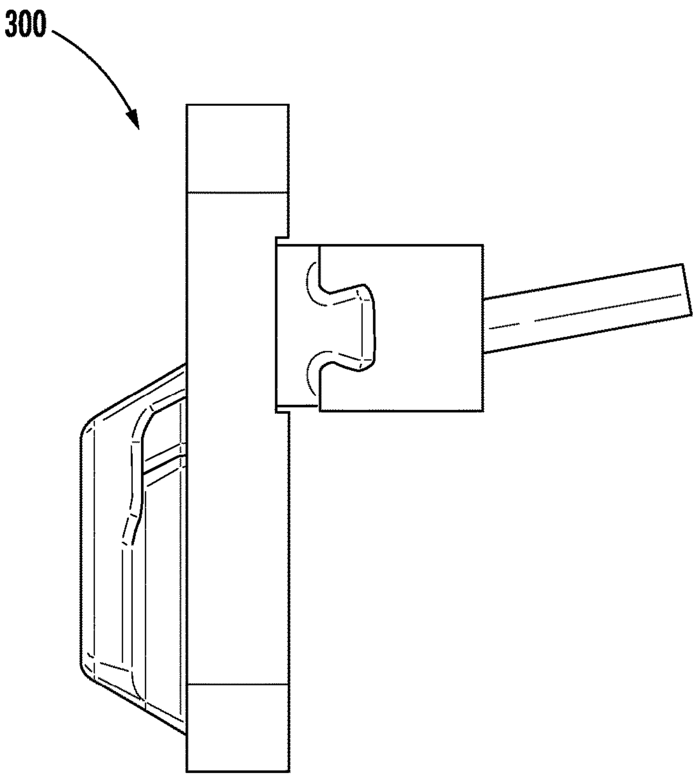
FIGS. 71-72 are several views of a coupling platform configured to couple to a modular system, according to an exemplary embodiment.
Figure 72:
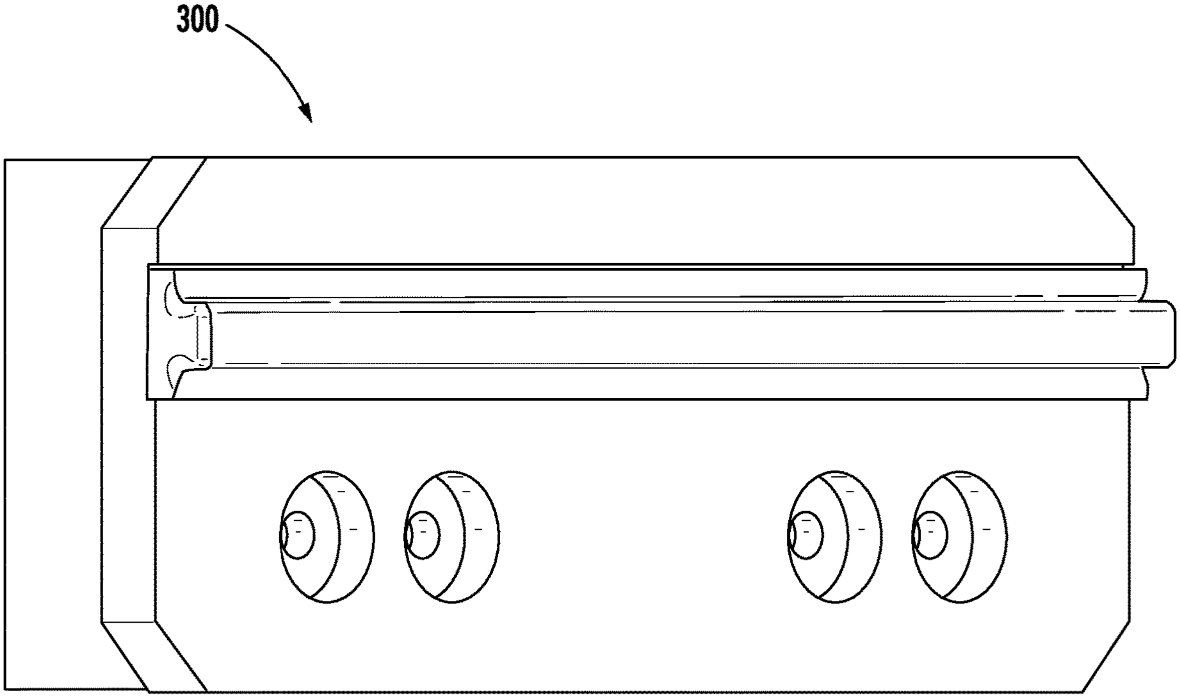

Referring to FIGS. 71-72, various aspects of a coupling platform 300 are shown. Coupling platform 300 includes a projection, shown as a dovetail, that extends away from the one or more coupling mechanisms (e.g., male couplers, such as the male coupler shown on the left in FIG. 71) extending from a back of the coupling platform 300.

Figure 73:
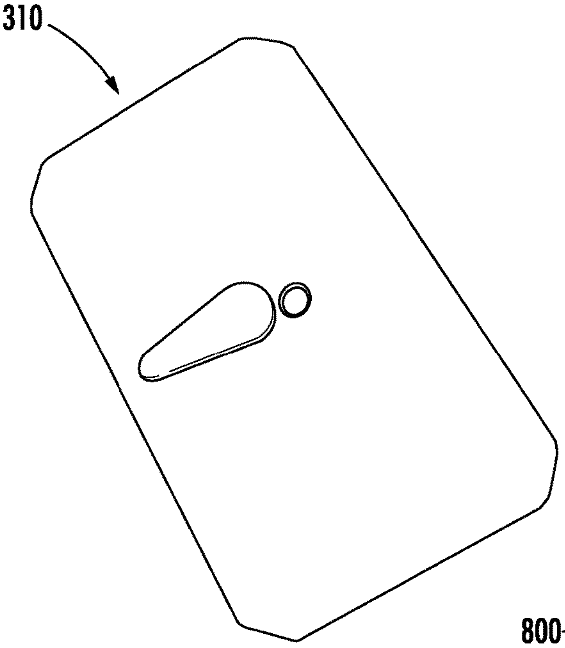
FIGS. 73-75 are several perspective views of a coupling platform configured to couple to a modular system, according to an exemplary embodiment.
Figure 75:
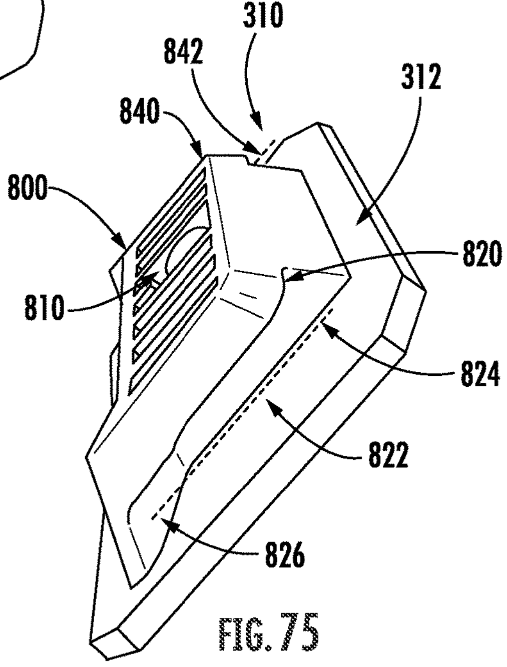
Figure 74:
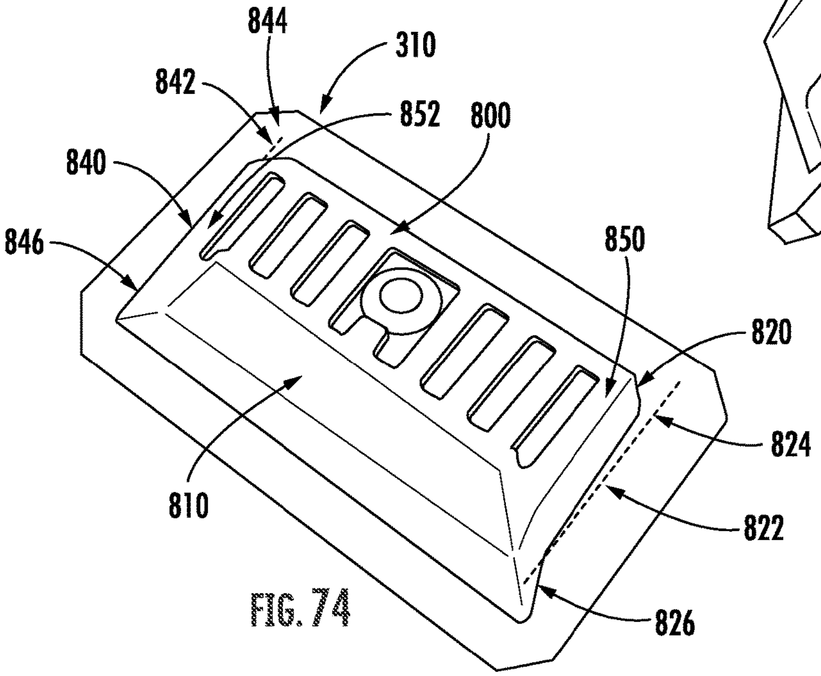

Referring to FIGS. 73-75, various aspects of coupling platform 310 are shown. Coupling platform 310 is used to secure a first device to an object, such as a wall. In various embodiments, coupling platform 310 is secured to a first device, such as by inserting the male coupler into a female coupler and turning the securing device, shown as screw, to secure the coupling platform 310 to the first device. Then, the coupling platform 310 is attached to a protrusion, such as a screw extending from a wall, such as by inserting the screw into the opening on the back of coupling platform 310 (FIG. 75).

Referring to FIGS. 74-75, in various embodiments, coupling platform 310 includes a male coupler 800 extending from back surface 312 of coupling platform 310. Male coupler 800 includes a body 810 extending from the back surface 312, a first tongue 820, and a second tongue 840. The first tongue 820 and the second tongue 840 both extend from the body 810 and both are offset from and above the back surface 312. The first tongue 820 defines a first channel 822 between the back surface 312 and the first tongue 820, and the second tongue 840 defines a second channel 842 between the back surface 312 and the second tongue 840. The first channel 822 and second channel 842 each extend on opposing sides (e.g., first side 850 and opposing second side 852) of the body 810.

Each of first channel 820 and second channel 840 includes a front open end and a back closed end. For example, first channel 820 includes a front open end 824 and a back closed end 826, and second channel 840 includes a front open end 844 and a back closed end 846.

It will be understood that one or more of the embodiments described herein utilize one or more male couplers that are structurally and/or functionally the same or similar to male coupler 800. For example, the one or more male couplers couple the embodiment to a plate coupled to a wall, the plate including one or more female couplers that the male couplers couple to.

Figure 76:
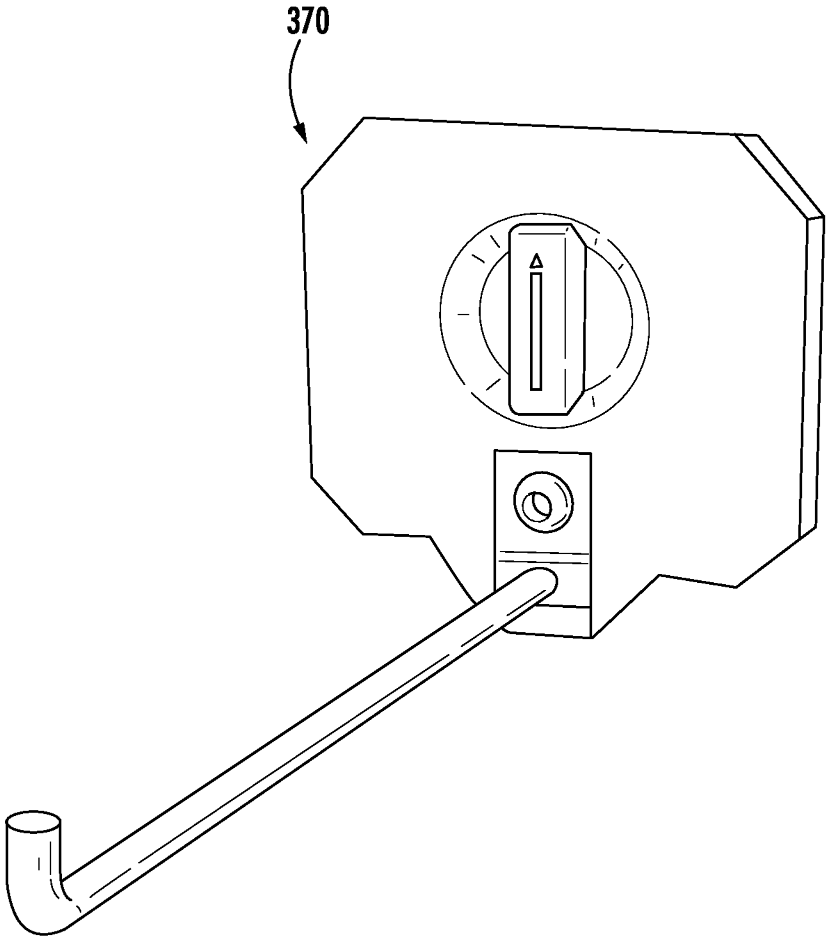
FIG. 76 is a perspective view of a securing platform, according to an exemplary embodiment.

Referring to FIGS. 76, various aspects of securing platform 370 are shown. Securing platform 370 includes a coupling component, such as a male coupler, that couples securing platform 370 to a device, shown as a plate including female couplers. The securing platform 370 includes a projection, shown as hook, extending laterally away from body and the male coupler.

Figure 77:
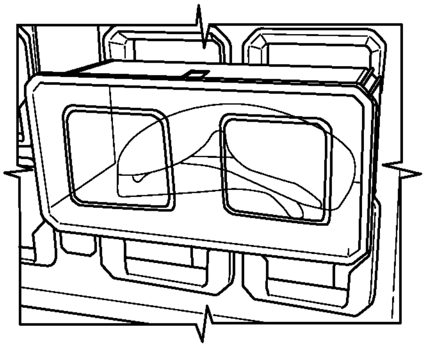
FIGS. 77-79 are several perspective views of a utility device, according to an exemplary embodiment.
Figure 78:
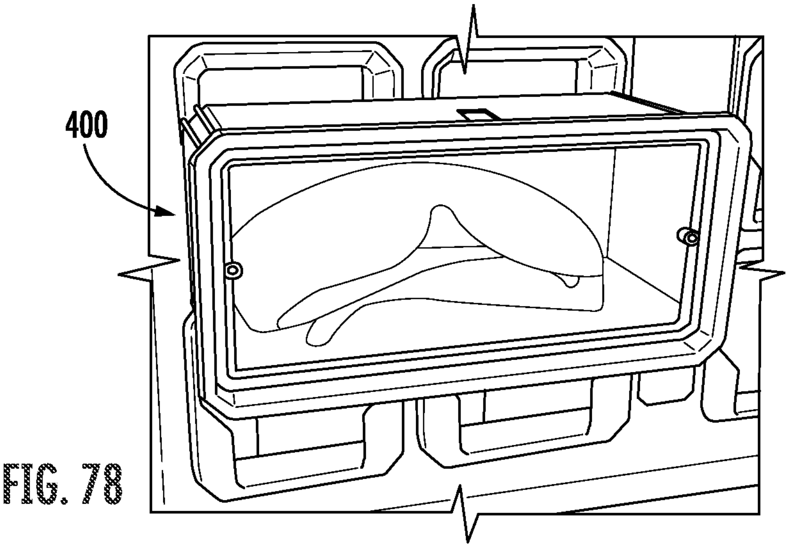
Figure 79:
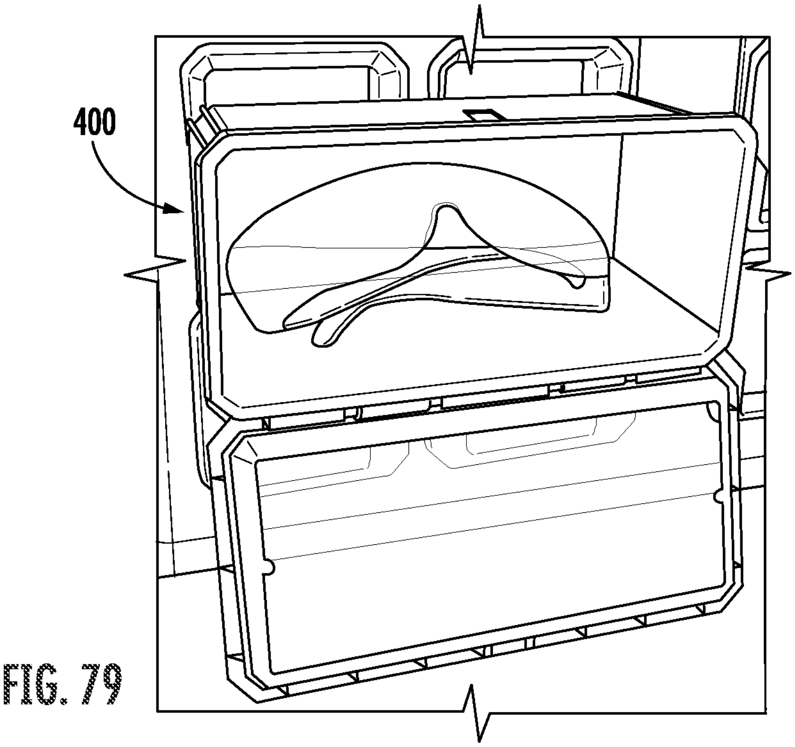
Figure 80:
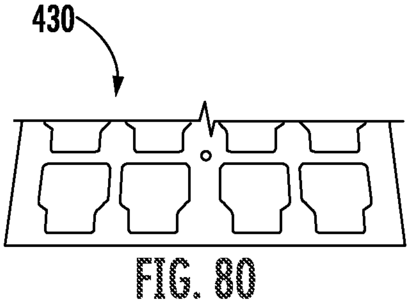
FIGS. 80-84 are several views of mounting plates, according to exemplary embodiments.
Figure 81:
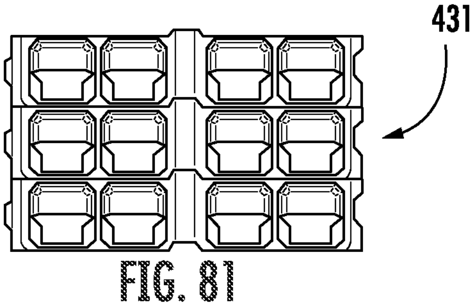
Figure 82:
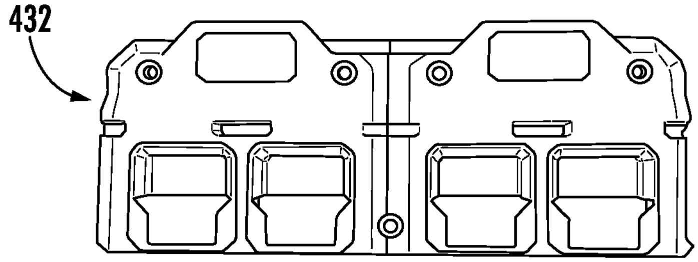
Figure 83:
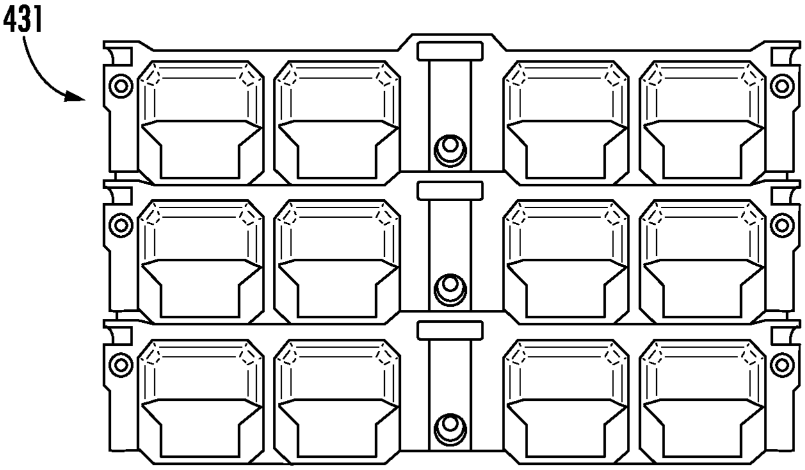
Figure 84:
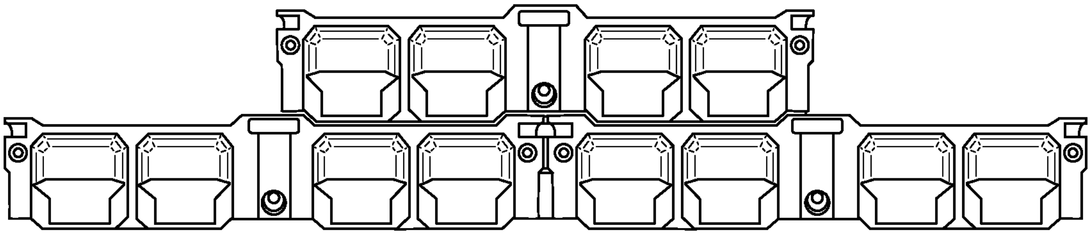

Referring to FIGS. 77-79, various aspects of utility device 470 are shown. In various embodiments utility device 470 includes a container that couples to a plate include female couplers. In various embodiments utility device 470 includes a covering plate that actuates between an open position (FIG. 78) and a closed position (FIG. 79).

In various embodiments the storage structure is a large bin.

Referring to FIGS. 80-84, various aspects of mounting plates are shown.

In regard to the 4×1 Mounting Plate design, in various embodiments the mounting plate 430 and mounting plate 431 are coupled to a wall, such as via the apertures (e.g., via screws, nails). The 4×1 female coupling components on the mounting plates 430, 431 are configured to receive corresponding male coupling components, such as after the 4×1 Mounting Plate is coupled to a wall. In one design, the mounting plate 432 includes a partial locker plate above the coupling components. In another design, the mounting plate 431 does not include the partial locker plate above the coupling components. The mounting plate 431 is configured such that more than one embodiment (e.g., three embodiments) can be placed next to each other to mate with a full-size device. One or both of the designs shown are configured to be spaced apart only on the top and bottom rows to be able to fit all of the functionality of a full plate with locking features.

Figure 85:
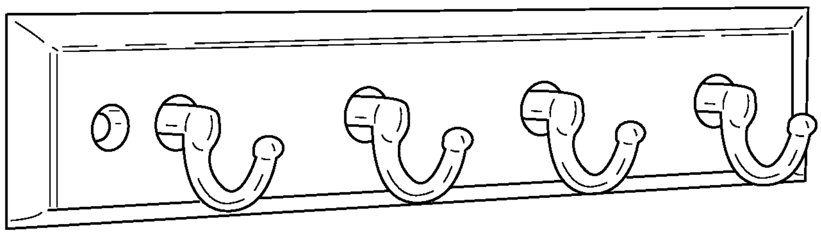
FIGS. 85-86 are several perspective view of a mounting platform, according to an exemplary embodiment.
Figure 86:
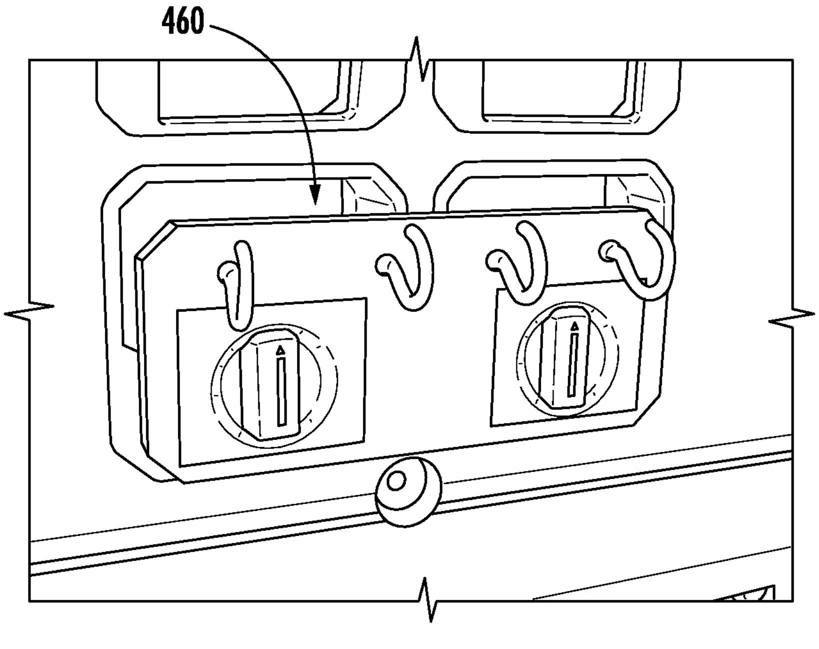

Referring to FIGS. 85-86, various aspects of mounting platform 460 are shown.

In various embodiments the hooks, shown as J-hooks, come out of the bottom rather than the coming out of the middle.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the disclosure will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present disclosure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the disclosure relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

What is claimed is:

1. A support mechanism comprising:

a base defining a back surface and an opposing front surface;

one or more sidewalls extending from the front surface, the front surface and the one or more sidewalls defining a containment area;

a magnet coupled to the base;

a support structure extending from the back surface; and a first protrusion extending circumferentially around and outward from a radially outward facing side surface of the support structure, the first protrusion offset from and above the back surface.

2. The support mechanism of claim 1, comprising at least three protrusions including the first protrusion, each of the at least three protrusions extending circumferentially around and radially outward from the radially outward facing side surface of the support structure, and each of the at least three protrusions offset from and above the back surface.

3. The support mechanism of claim 1, wherein the support structure further comprises:

a first surface facing the back surface of the base;

a second surface opposing the first surface;

wherein the side surface extends between and connects the first surface and the second surface.

4. The support mechanism of claim 3, wherein the first protrusion is located on the support structure between the first surface and the second surface.

5. The support mechanism of claim 1, wherein the first protrusion extends in a circumferential direction.

6. The support mechanism of claim 1, wherein the first protrusion is offset from a back surface of the support structure.

* * * * *